US012666212B2

(12) United States Patent
Yang et al.

(10) Patent No.: US 12,666,212 B2
(45) Date of Patent: Jun. 23, 2026

(54) VARIABLE STIFFNESS DIAPHRAGM FOR A PLAYBACK DEVICE

(71) Applicant: Sonos, Inc., Goleta, CA (US)

(72) Inventors: Wei Yang, Boston, MA (US); Charles LaColla, Woodland Hills, CA (US)

(73) Assignee: Sonos, Inc., Goleta, CA (US)

( * ) Notice: Subject to any disclaimer, the term of this patent is extended or adjusted under 35 U.S.C. 154(b) by 215 days.

(21) Appl. No.: 18/553,773

(22) PCT Filed: Apr. 5, 2022

(86) PCT No.: PCT/US2022/071553
§ 371 (c)(1),
(2) Date: Oct. 3, 2023

(87) PCT Pub. No.: WO2022/217226
PCT Pub. Date: Oct. 13, 2022

(65) Prior Publication Data

US 2024/0196146 A1 Jun. 13, 2024

Related U.S. Application Data

(60) Provisional application No. 63/200,968, filed on Apr. 6, 2021.

(51) Int. Cl.
*H04R 31/00* (2006.01)
*H04R 7/12* (2006.01)

(52) U.S. Cl.
CPC .......... *H04R 31/003* (2013.01); *H04R 7/122* (2013.01)

(58) Field of Classification Search
CPC .............................. H04R 31/003; H04R 7/122
See application file for complete search history.

(56) References Cited

U.S. PATENT DOCUMENTS 5,440,644 A 8/1995 Farinelli et al.
5,761,320 A 6/1998 Farinelli et al.
5,923,902 A 7/1999 Inagaki
(Continued)

FOREIGN PATENT DOCUMENTS

EP 1389853 A1 2/2004
JP S5255735 U 4/1977
(Continued)

OTHER PUBLICATIONS

AudioTron Quick Start Guide, Version 1.0, Mar. 2001, 24 pages.
(Continued)

*Primary Examiner* — Sunita Joshi
(74) *Attorney, Agent, or Firm* — Fortem IP LLP

(57) ABSTRACT

A diaphragm for an audio transducer includes an annular body defining a central aperture, a first surface of the body extending between a radially inner edge adjacent the aperture and a radially outer edge, and a second surface of the body opposite the first surface, the second surface extending between the radially inner edge and the radially outer edge. Along a first azimuthal direction, the body has a first range of thicknesses extending between the first and second surfaces. Along a second azimuthal direction, the body has a second range of thicknesses extending between the first surface and the second surface, the second range of thicknesses being different than the first range of thicknesses.

20 Claims, 22 Drawing Sheets

(56) References Cited

U.S. PATENT DOCUMENTS

| | | | |
|---|---|---|---|
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0017736 A1 | 1/2007 | Takebe et al. | |
| 2007/0142944 A1 | 6/2007 | Goldberg et al. | |
| 2021/0058708 A1* | 2/2021 | Jones | H04R 9/06 |

FOREIGN PATENT DOCUMENTS

| | | | | |
|---|---|---|---|---|
| JP | S5255735 A | 5/1977 | | |
| JP | 2015170881 A | 9/2015 | | |
| WO | 200153994 | 7/2001 | | |
| WO | 2003093950 A2 | 11/2003 | | |
| WO | WO-2009090746 A1 * | 7/2009 | | H04R 7/122 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

International Searching Authority, International Search Report and Written Opinion mailed on Jul. 12, 2022, issued in connection with International Application No. PCT/US2022/071553, filed on Apr. 5, 2022, 18 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *DM Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

International Bureau, International Preliminary Report on Patentability, mailed on Oct. 19, 2023, issued in connection with International Application No. PCT/US2022/071553, filed on Apr. 5, 2022, 15 pages.

* cited by examiner

VARIABLE STIFFNESS DIAPHRAGM FOR A PLAYBACK DEVICE

CROSS-REFERENCE TO RELATED APPLICATION

This application is a 371 U.S. national phase of International Patent Application No PCT/US2022/071553, filed Apr. 5, 2022, which claims the benefit of priority to U.S. Provisional Application No. 63/200,968, filed Apr. 6, 2021, each of which is hereby incorporated by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
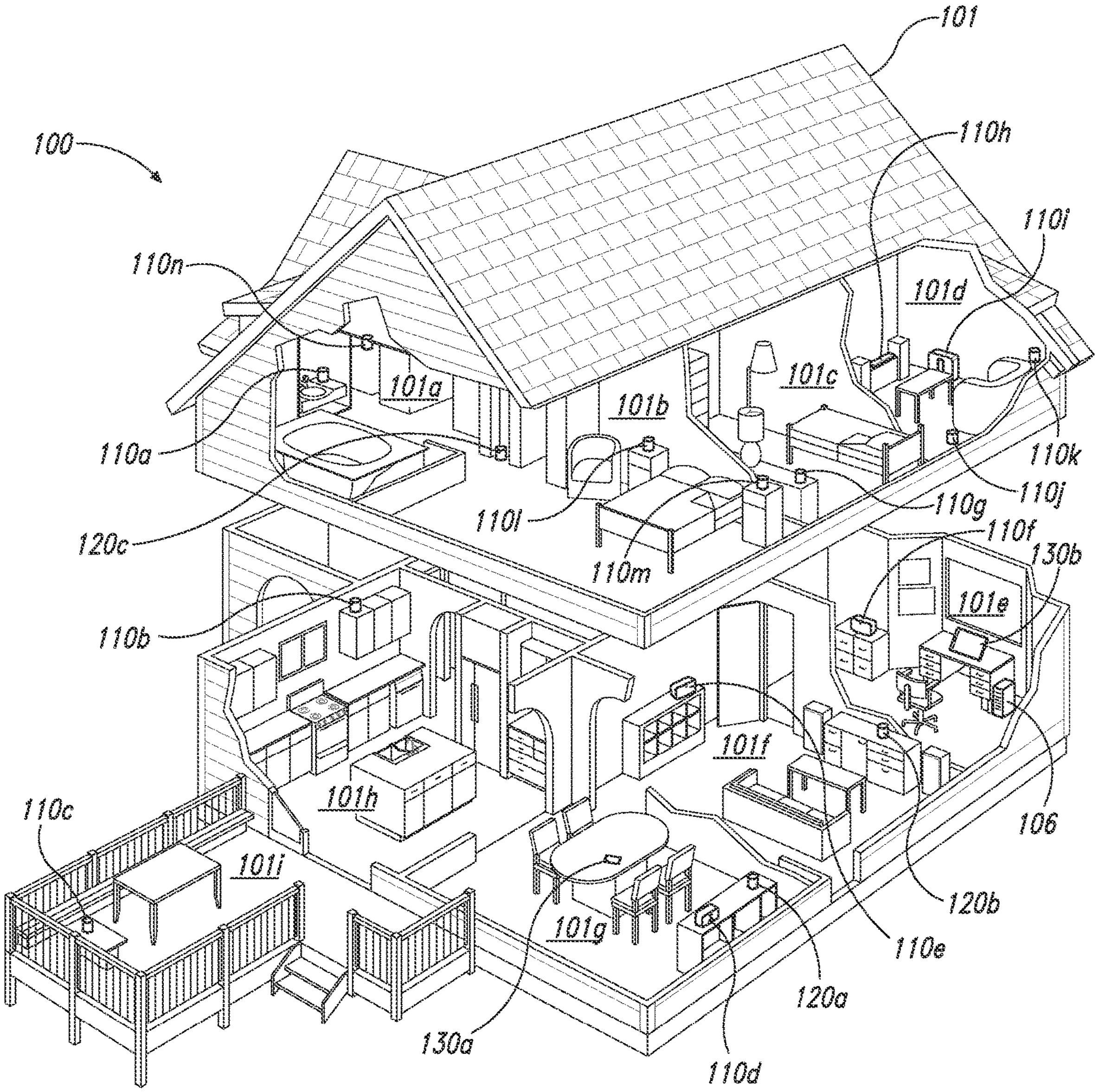
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Conventional audio transducers may include a diaphragm having a conical or elliptical frustum shape that is coupled to a voice coil and suspended by a surrounding frame. In response to electrical signals passing through the voice coil, the voice coil vibrates within a magnetic gap, thereby causing the diaphragm to vibrate and produce soundwaves. Ideally, each point on the diaphragm moves in synchrony according to the vibrations of the voice coil. Any deviation from such "pistonic" motion, or any deformation of the diaphragm itself, can cause undesirable resonances or break-ups that are perceived as acoustic distortion. Breakup can occur when the forces acting upon the diaphragm overcome its structural integrity, causing different points on the surface of the diaphragm to move in different times relative to one another. The resulting nonlinear displacement of the diaphragm can produce soundwaves that are out of phase with one another leading to self-interference and deterioration in audio quality. In general, such breakup is more likely to occur at higher frequencies. The lowest frequency at which breakup occurs can be referred to as the "breakup frequency" of the transducer, and may effectively determine the upper limit of the useful and/or most effective band-pass of the audio transducer.

The geometry and mechanical properties of the diaphragm can have a significant impact on the acoustic performance of the transducer, and in particular can determine the transducer's susceptibility to breakup at particular frequencies. Increasing the stiffness of the diaphragm can improve the structural integrity of the diaphragm, and thereby increase the breakup frequency and/or reduce the amplitude of any breakup. Previous attempts to improve diaphragm performance and reduce the effect of breakup include the use of stiffer materials such as aluminum or beryllium, as well as the use of reinforcing ribbing disposed over a surface of the diaphragm. Such approaches are relatively expensive, may be more difficult to manufacture, may introduce undesirable cosmetic drawbacks (e.g., sink marks), and still may not sufficiently raise the breakup frequency to a desirable level. Additionally, using metals to form the diaphragm increases the diaphragm's weight, which may deleteriously affect acoustic performance (e.g., by reducing the responsiveness of the transducer).

Various examples of the present technology can improve the acoustic performance of an audio transducer by carefully controlling the stiffness of the diaphragm while maintaining an acceptably low weight and without requiring the use of expensive diaphragm materials. In some examples, the stiffness can be increased in regions of the diaphragm that are most susceptible to nonlinear displacement at the breakup frequency, thus eliminating or reducing the audio distortion that would otherwise result at that particular frequency. In some examples, the stiffness of the diaphragm can be controlled by varying the thickness of the diaphragm at specified locations. For instance, as will be described in more detail below, the thickness of the diaphragm can be greater in regions of the diaphragm that are more prone to nonlinear displacement during audio playback, while the thickness of the diaphragm can be lower in regions of the diaphragm that are less prone to such nonlinear displacement. The controlled thickness and/or stiffness of the diaphragm can lead to an improved frequency response, and thus, an improved acoustic performance.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
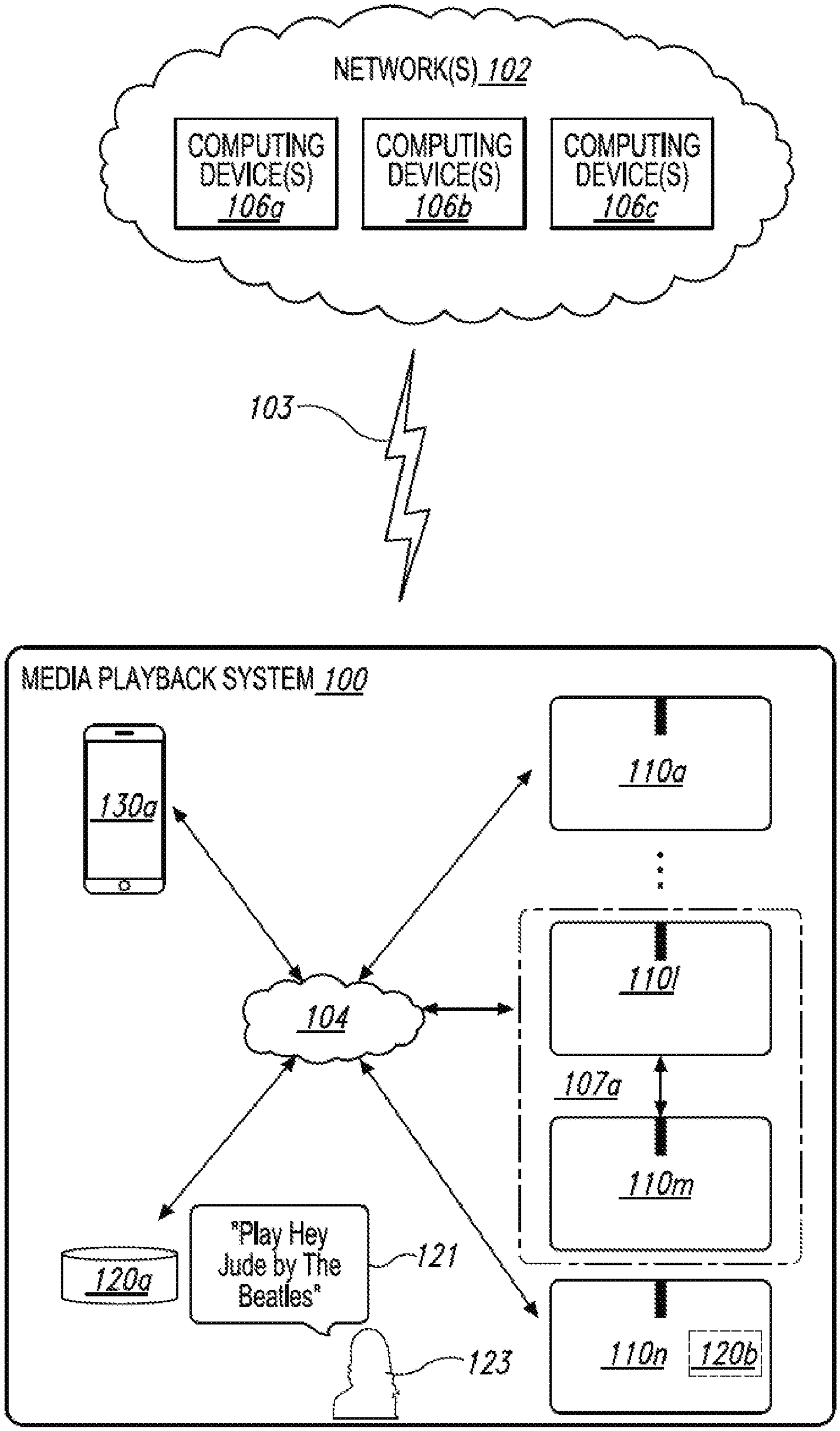
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
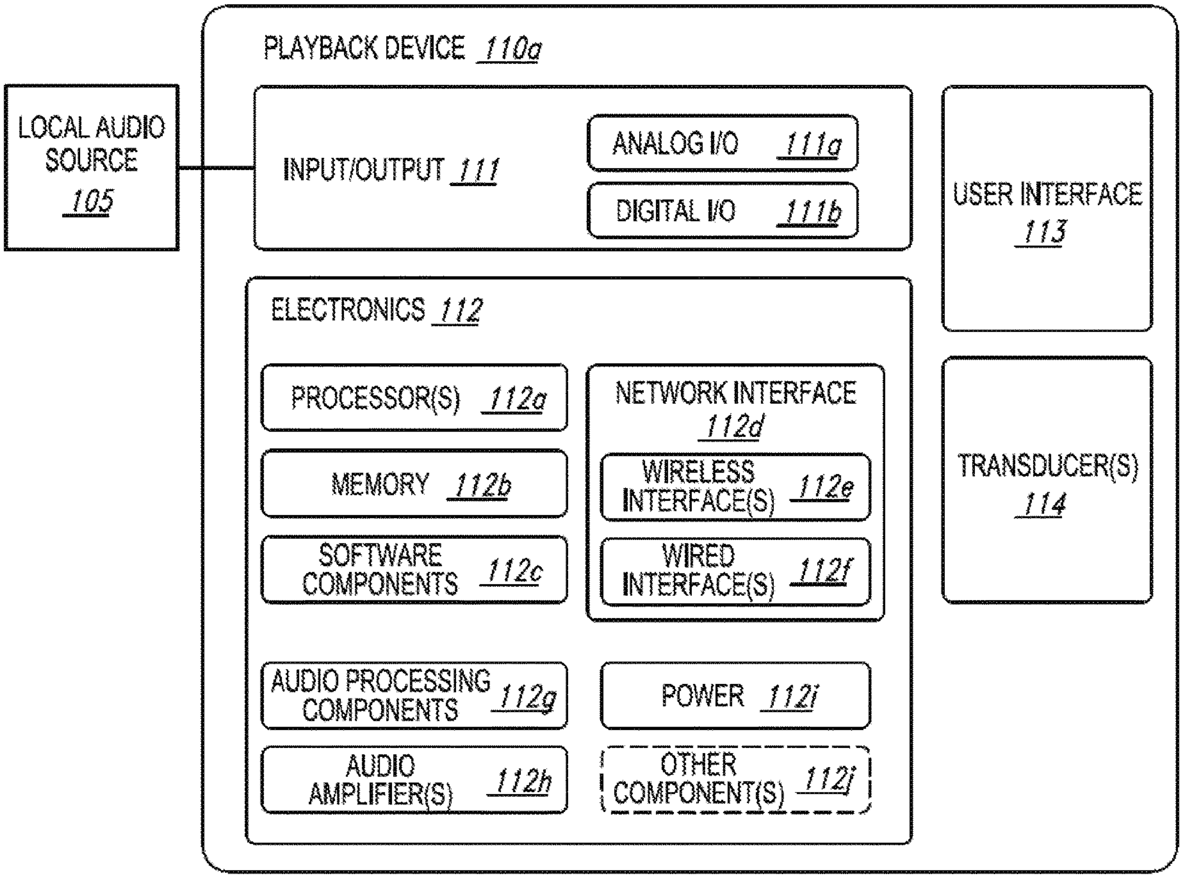
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
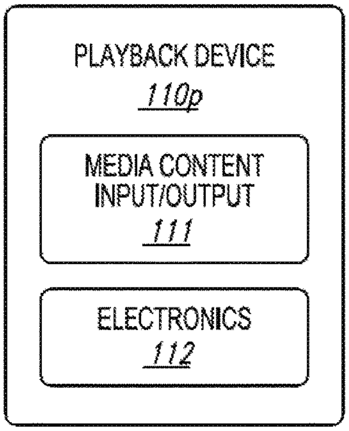
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for example, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
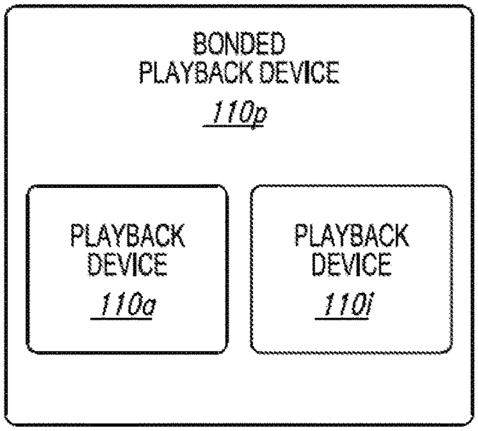
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
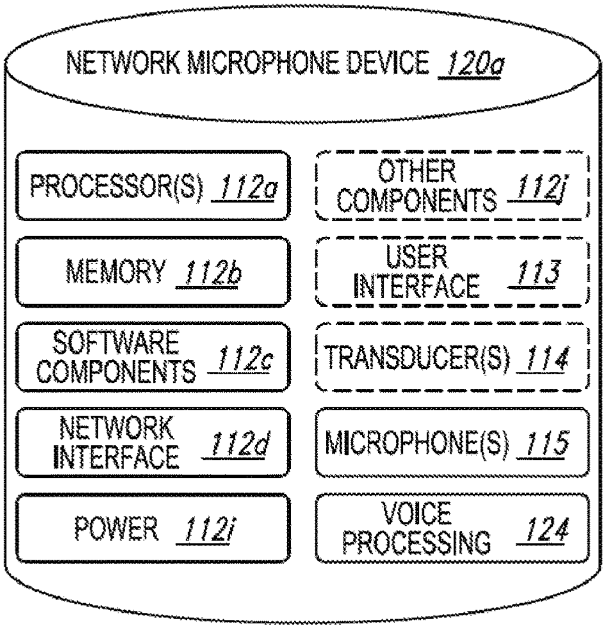
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
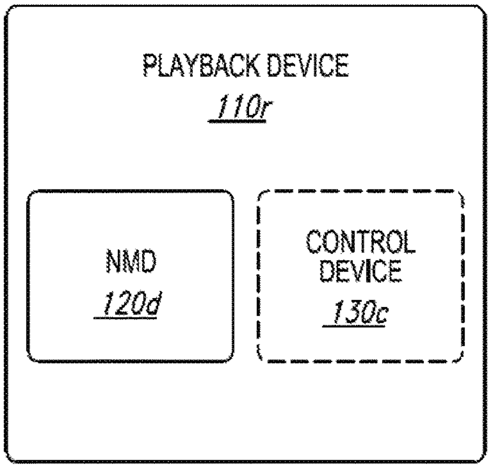
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
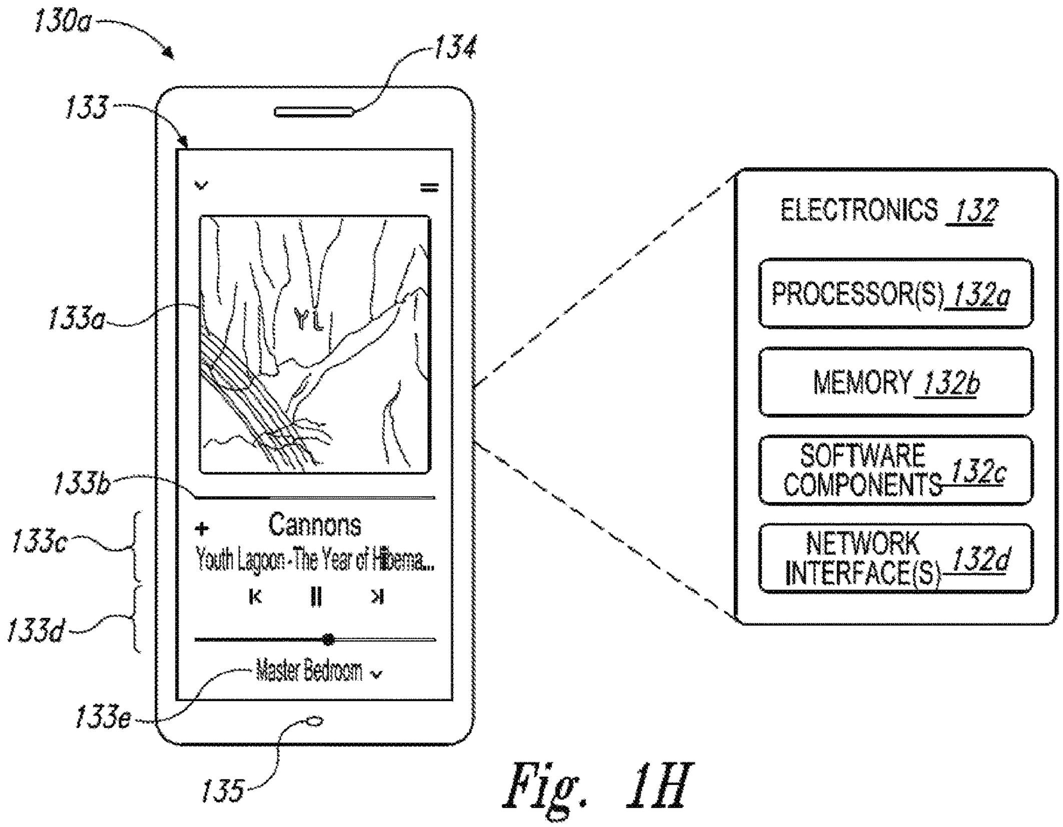
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™ an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™ an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
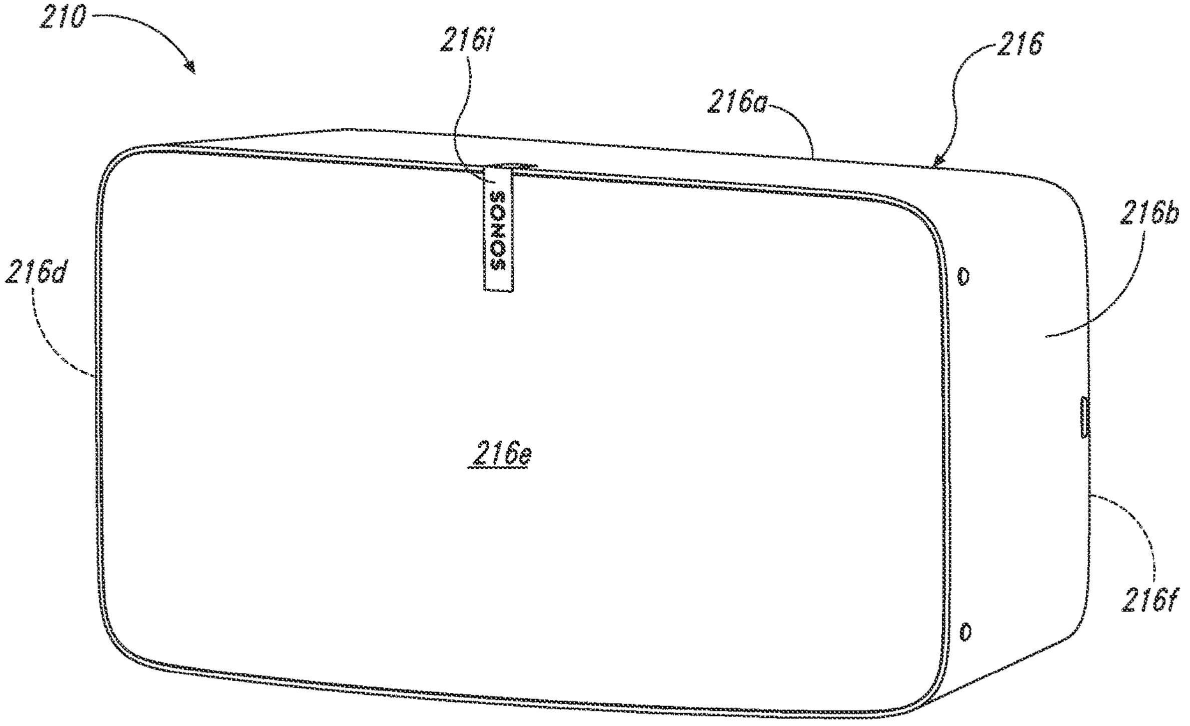
FIG. 2A is a front isometric view of a playback device configured in accordance with examples of the disclosed technology.
Figure 2B:
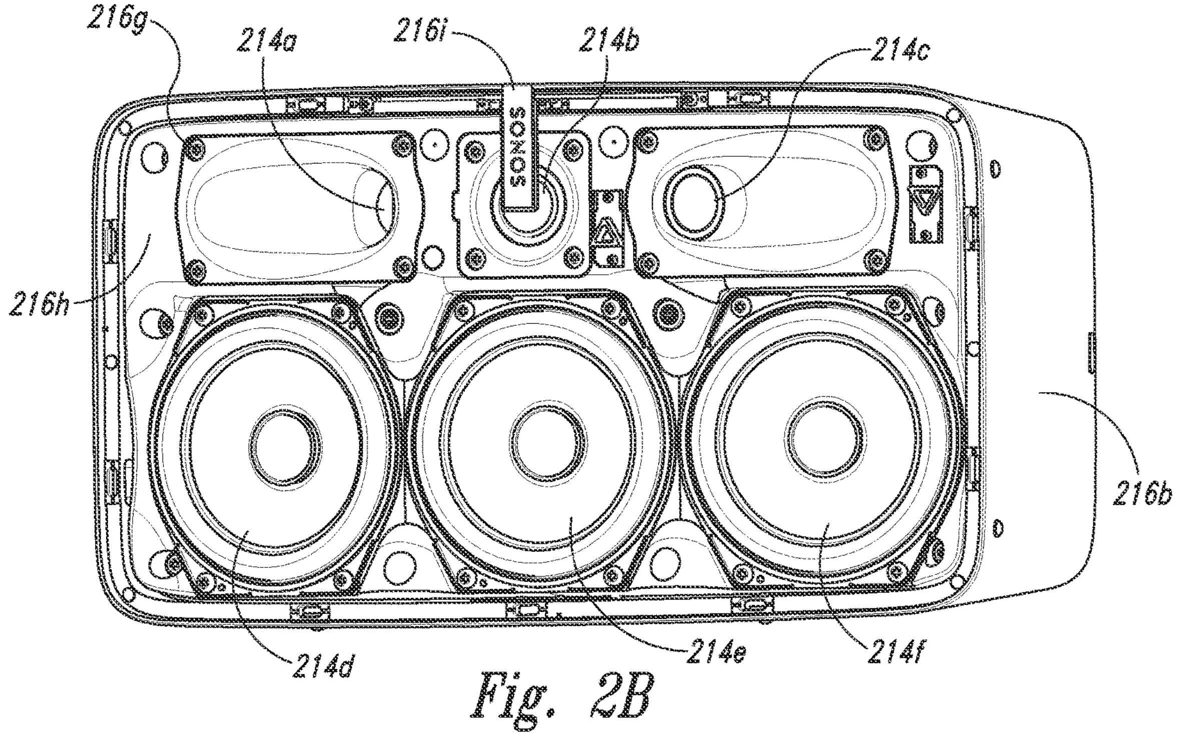
FIG. 2B is a front isometric view of the playback device of FIG. 2A without a grille.
Figure 2C:
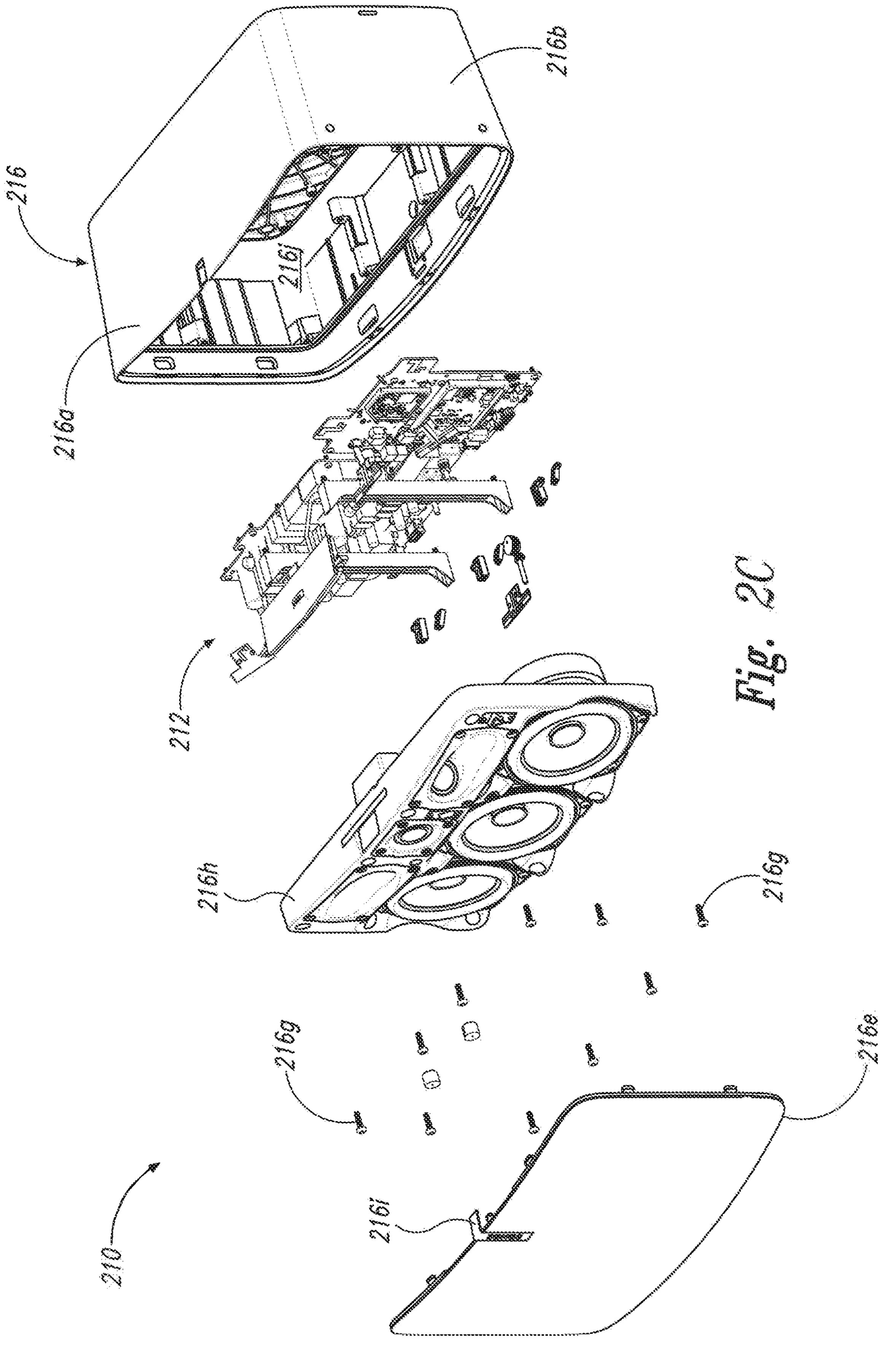
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

Figure 3A:
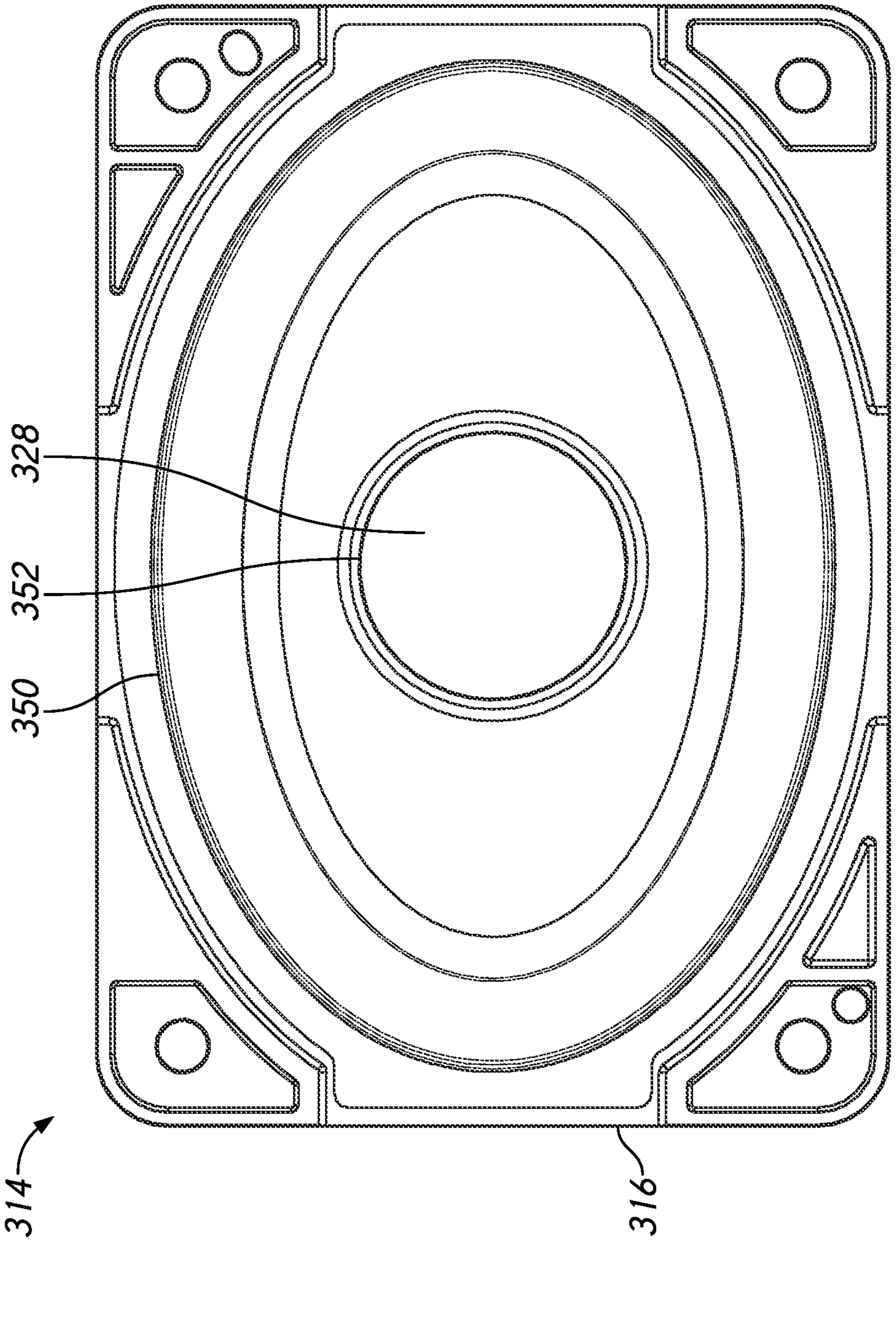
FIG. 3A is a top view of a transducer configured in accordance with examples of the disclosed technology.
Figure 3B:
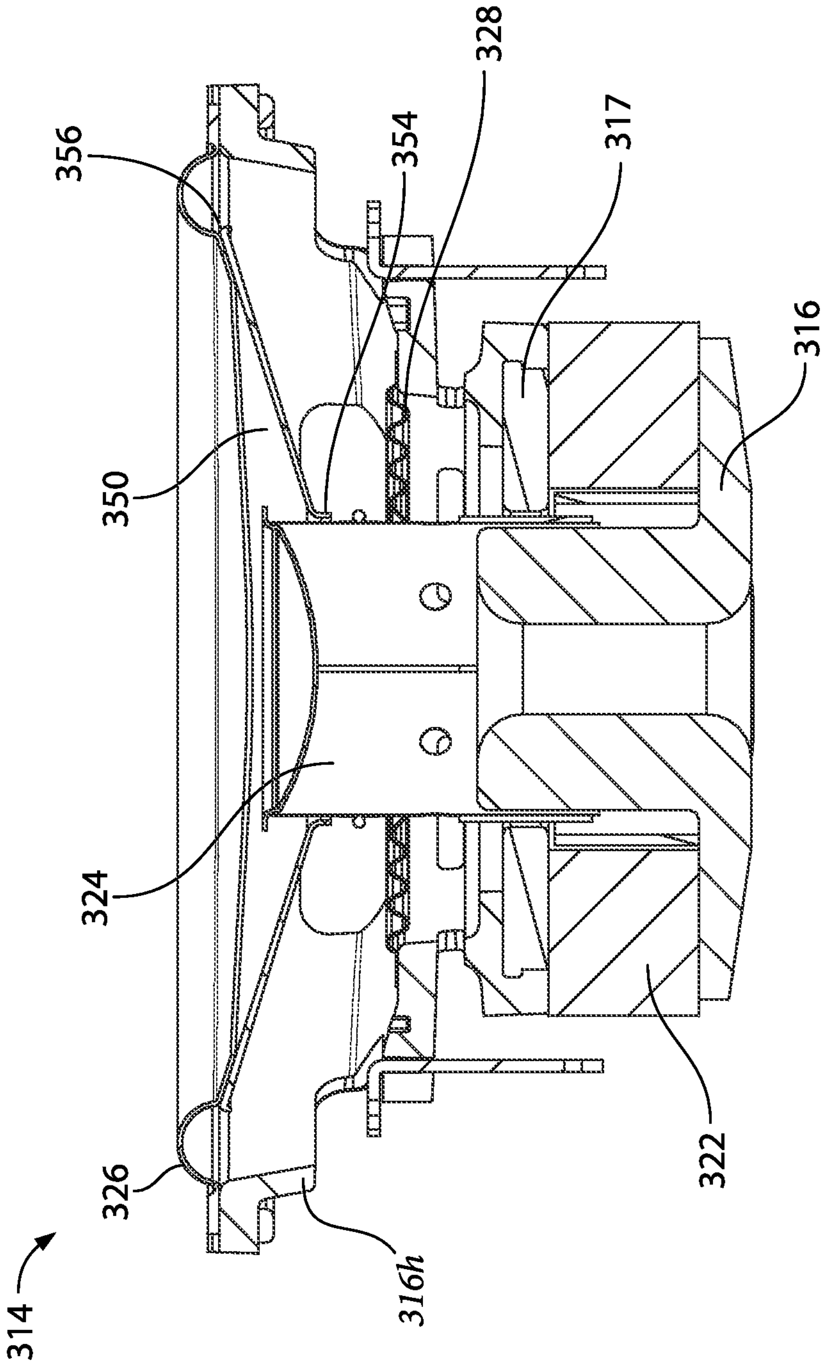
FIG. 3B is a sectional view of the transducer of FIG. 3A.

FIG. 3A is a top view of an audio transducer 314 and FIG. 3B is a cross-sectional side view of the transducer 314. The transducer 314 includes a body defined by a frame 316*h*, a basket, or a housing 316, which extends around the sides and base of the transducer 314. A magnet 322 attached to the housing 316 near the base of the transducer 314 has a center aperture surrounding a voice coil 324 with one or more steel members 317 positioned above the magnet 322. A suspension element or spider 328 maintains a position of the voice coil 324 with respect to the aperture of the magnet 322. A diaphragm 350 extends from a radially inner edge 354 to a radially outer edge 356. The radially inner edge 354 of the diaphragm 350 surrounds an aperture 352 and is coupled to the voice coil 324 such that the diaphragm 350 moves in response to movement of the voice coil 324. A surround 326 resiliently couples the radially outer edge 356 of the diaphragm 350 to the frame 316*h*. A dust cap 328 axially overlaps the aperture 352 of the diaphragm 350 to prevent dust and/or debris from entering into the transducer 314.

In operation, the voice coil 324 receives a flow of electrical signals from an external amplifier, causing a resultant magnetic field to form. The one or more steel members 317 can guide and/or focus the generated magnetic flux to travel through the voice coil 324. In response to the magnetic flux, the voice coil 324 moves axially inward and outward, which also causes corresponding axial movement of the diaphragm 350 and dust cap 328. As the diaphragm 350 moves axially, the diaphragm 350 pushes and pulls on the surrounding air, generating sound waves at one or more frequencies. As noted previously, as the diaphragm 350 generates sound waves at particular frequencies or ranges of frequencies, one or more nonlinear displacements may occur along a body 351 (FIG. 3C), e.g., resonances, standing waves, or breakups. At some frequencies, these displacements can be relatively contained, and thus, do not create any noticeable distortion with the outputted sound. At other frequencies (e.g., at the breakup or cutoff frequency), these displacements can be relatively large, creating a noticeable distortion in the outputted sound.

In some examples, the stiffness of the diaphragm 350 can be selected to reduce the amount of undesirable displacement at one or more regions of the diaphragm 350 during playback of a particular frequency or frequency range. As will be described in further detail below, increasing the stiffness of the diaphragm 350 at such high-displacement regions can reduce or eliminate acoustic distortion during playback of a particular frequency or range of frequencies. By removing or reducing the outputted sound distortion at a particular frequency, the frequency range over which an audio transducer 314 can properly perform (e.g., perform without any noticeable distortion with the outputted sound) can be expanded. For example, an audio transducer with a conventional diaphragm having constant thickness may properly perform at a frequency range between about 1 kHz to about 4 kHz. In contrast, in some instances, the audio transducer 314 having the diaphragm 350 with varying thickness can properly perform at a frequency range between, for example, about 1 kHz to about 7 kHz, allowing the produced soundwaves to have a cutoff or breakup frequency of about 7 kHz. Accordingly, by shifting the breakup frequency to a higher frequency value, the acoustic performance of the transducer is expected to improve. In various examples, the amount the breakup frequency is shifted can depend upon, in part, the radiating area of the diaphragm 350. For instance, in some examples where the radiating area of the diaphragm 350 is 20 centimeters squared, the breakout frequency can be extended from 4 kHz to 7 kHz. When the radiating area is smaller (e.g., 10 centimeters squared), the breakout frequency can be extended from 14 kHz to 20 kHz. When the radiating area is larger (e.g., 60 centimeters squared), the breakout frequency can be extended from 1000 Hz to 1800 Hz.

Figure 3C:
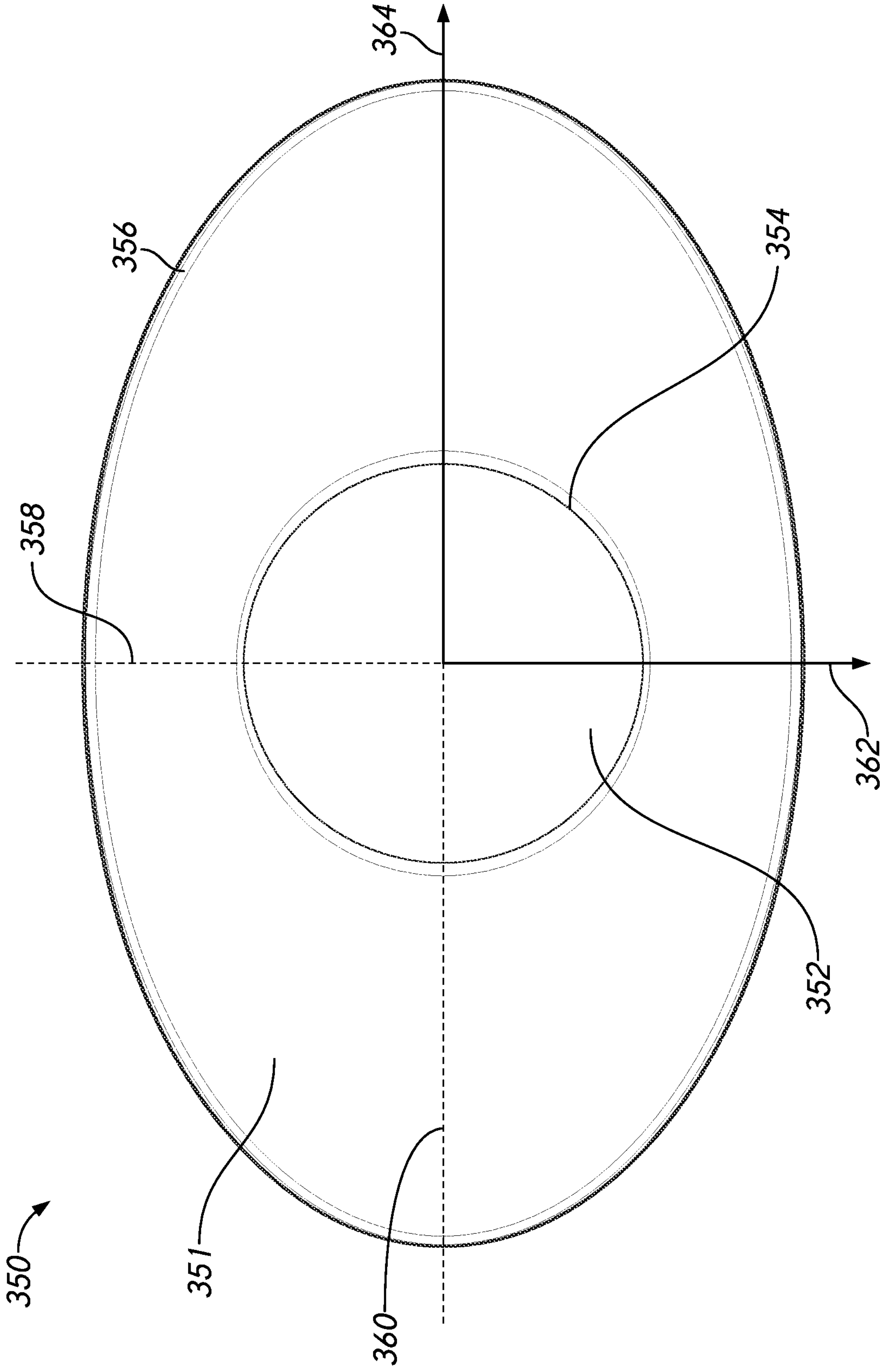
FIG. 3C a top view of a diaphragm configured in accordance with examples of the disclosed technology.
Figure 3D:
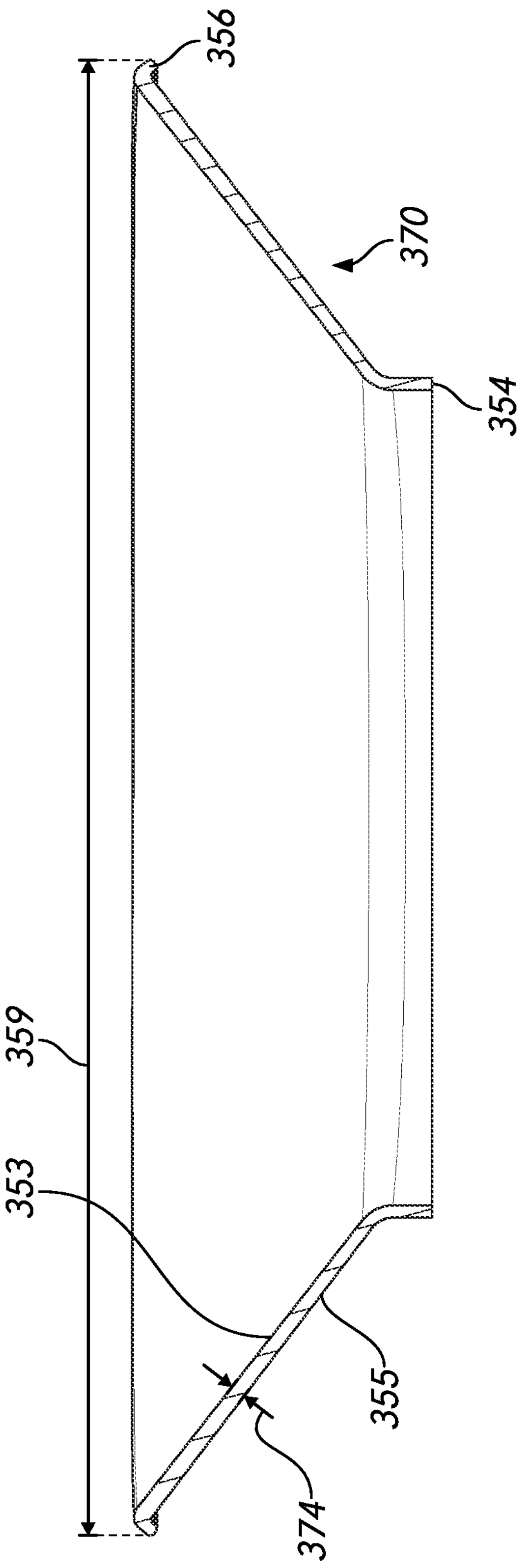
FIG. 3D is a side sectional view of the diaphragm of FIG. 3C.
Figure 3E:
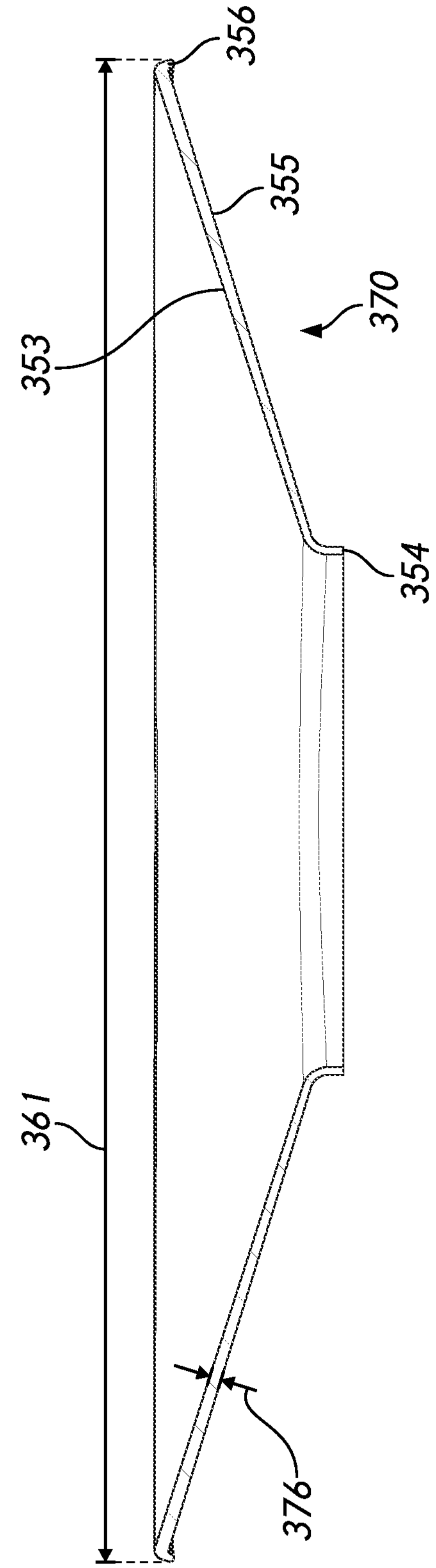
FIG. 3E is a side sectional view of the diaphragm of FIG. 3C.
Figure 3F:
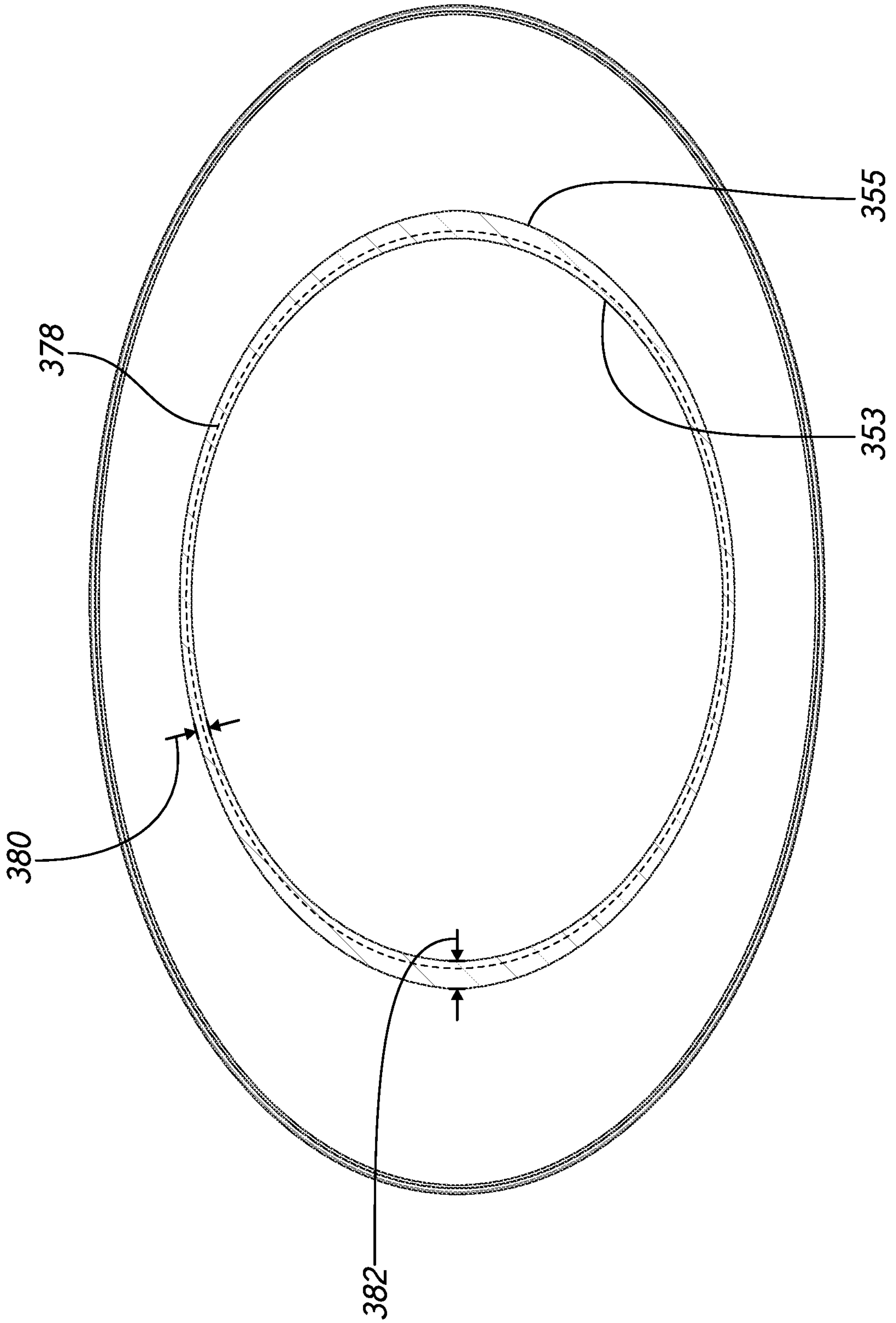
FIG. 3F is a bottom sectional view of the diaphragm of FIG. 3C.

FIGS. 3C-3F are several example views of the diaphragm 350. FIG. 3C is a top view of the diaphragm 350 and includes a minor axis 358 and a major axis 360. FIG. 3D is side sectional view of the diaphragm 350 along the minor axis 358 of FIG. 3C, FIG. 3E is a side sectional view of the diaphragm 350 along the major axis 360 of FIG. 3C, and FIG. 3F is a bottom sectional view of the diaphragm 350. Although the diaphragm 350 is illustrated as having an elliptical or "racetrack" configuration, in various embodiments the variable stiffness and/or thickness of the diaphragm as described herein can be applied to circular (e.g., conical or otherwise radially symmetrical) diaphragms and transducers, as well as transducers having any other suitable shape (e.g., spherical transducers).

The diaphragm 350 can be defined by the body 351 which extends between a radially inner edge 354 and a radially outer edge 356. The body 351 can include an inner surface 353 and an outer surface 355 opposite the inner surface 353. The inner surface 353 and outer surface 355 can extend between the radially inner edge 354 and radially outer edge 356 of the body 351. The body 351 can form an elliptical frustum shape, with the body 351 extending upwards and outwards from the radially inner edge 354 to the radially outer edge 356. In some examples, the body 351 can form a conical shape, an elliptical frustum shape, a partial spherical shape, a shell shape, a flat disk shape, or any other suitable shape. In various examples, the body 351 defines an aperture 354 near the center of the body 351. Additionally or alternatively, the body 351 can be formed without the aperture 352.

The minor axis 358 has a length 359, which is defined as the shortest length across the body 351 and the major axis 360 has a length 361, which is defined as the longest length across the body 351. Outside of the minor axis 358 and major axis 360, the length of the body 351 will vary between the values of the length 359 and length 361. In various examples, the body 351 does not define axes of different lengths, but instead defines two perpendicular axes of the same length (e.g. X and Y axes).

In some examples, the body 351 can define an arbitrary number of azimuthal directions that extend from the center of the aperture 352 outwards towards the radially outer edge 356 of the body 351. For example, the body 351 can define a first azimuthal direction 362 that extends from the center of the aperture 352 outwards along the minor axis 358 towards the radially outer edge 356, a second azimuthal direction 364 that extends from the center of the aperture 352 outwards along the major axis 360 towards the radially outer edge 356, and any suitable number of azimuthal directions in between or outside the first azimuthal direction 362 and second azimuthal direction 364.

In some examples, the body 351 can define an arbitrary number of circumferential axes. A circumferential axis can be defined as the perimeter of an edge of the body after making a transverse cut through the body 351. For example, as illustrated in FIG. 3F, the body 351 has a circumferential axis 378 visible after making a transverse cut through the body 351. In some examples, no transverse cut is needed to define a circumferential axis. For instance, the radially inner edge 354 and radially outer edge 356 of the body can define a circumferential axis.

The body 351 can have a thickness extending between the inner surface 353 and the outer surface 355 of the body 351. In some examples, the thickness of the body 351 is constant. In various examples, the body 351 can have several different thicknesses extending between the inner surface 353 and the outer surface 355 of the body 351. For instance, the body 351 can have a first thickness 374 (FIG. 3D), and a second thickness 376 (FIG. 3E) that is different (e.g., greater than or less than) than the first thickness 374. In some examples, the thickness of the body 351 can vary between the radially inner edge 354 and the radially outer edge 356. For instance, the thickness of the body 351 can increase from the radially inner edge 354 to the radially outer edge 356 to have a range of thicknesses extending from the radially inner edge 354 and the radially outer edge 356. In some examples, the thickness extending from the radially inner edge 354 to the radially outer edge 356 increases in a linear manner. In various examples, the thickness extending from the radially inner edge 354 and the radially outer edge 356 increases in a nonlinear manner. In some examples, the thickness can decrease from the radially inner edge 354 to the radially outer edge 356. In various examples, the thickness can increase and decrease along the radially inner edge 354 to the radially outer edge 356. In some examples, the thickness is constant from the radially inner edge 354 to the radially outer edge 356.

In some examples, the range of thicknesses of the body 351 can vary along different azimuthal directions. For instance, the range of thicknesses extending from the radially inner edge 354 to the radially outer edge 356 along the first azimuthal direction 362 can be different (e.g., include values that are larger than any other value, include values that are smaller than any other value, and/or have a larger or smaller average value) than the range of thicknesses extending from the radially inner edge 354 to the radially outer edge 356 along the second azimuthal direction 364. In some examples, the average thickness of the body 351 along an azimuthal direction (e.g., the average thickness from the radially inner edge 354 to the radially outer edge 356 along the azimuthal direction) will be at its largest value when the azimuthal direction is along the major axis 360 and will be at its smallest value when the azimuthal direction is along the minor axis 358. In some of these examples, or otherwise, the average thickness of the body 351 along an azimuthal direction will be larger when the azimuthal direction moves closer to the major axis 360 and will be smaller when the azimuthal direction move closer to the minor axis 358. In various examples, the average thickness of the body 351 along an azimuthal direction will be at its largest value when the azimuthal direction is along the minor axis 358 and will be at its smallest value when the azimuthal direction is along the major axis 360. In some of these examples, or otherwise, the average thickness of the body 351 along an azimuthal direction will be larger when the azimuthal direction moves closer to the minor axis 358 and will be smaller when the azimuthal direction move closer to the major axis 360.

Referring to FIG. 3F, the body 351 can have a range of thicknesses along a circumferential axis of the body 351. For example, the body can have a varying thickness along the circumferential axis 378, including a first thickness 380 and a second thickness 382 that is a different than the first thickness 380. In various examples, the thickness of the body 351 along the circumferential axis 378 will be at its largest value at the intersection with the major axis 360 and will be at its smallest value at the intersection with the minor axis 358. In some of these examples, or otherwise, the thickness of the body 351 along the circumferential axis 378 will be larger closer to the major axis 360 and will be smaller closer to the minor axis 358. In various examples, the thickness of the body 351 along the circumferential axis 378 will be at its largest value at the intersection with the minor axis 358 and will be at its smallest value at the intersection with the major axis 360. In some of these examples, or otherwise, the thickness of the body 351 along the circumferential axis 378 will be larger when the closer to the minor axis 358 and will be smaller closer to the major axis 360.

In some examples, the thickness of the body 351 along the circumferential axis can vary between the radially inner edge 354 and the radially outer edge 356. For instance, the average thickness along a circumferential axis can increase, decrease, or both increase and decrease from the radially inner edge 354 to the radially outer edge 356. In some examples, the average thickness along a circumferential axis can be at its largest value at the radially outer edge 356. In various examples, the average thickness along a circumferential axis can be at its smallest value when the circumferential axis is the radially inner edge 354. In some examples, the average thickness along a circumferential axis can be at its largest value at a circumferential axis positioned between the radially inner edge 354 and the radially outer edge 356.

The body 351 can have a stiffness that varies at different locations along the body 351 so as to have a range of stiffnesses along the body 351. For instance, the stiffness of the body 351 at various points along the first azimuthal direction 362 can be different than the stiffness of the body 351 at various points along the second azimuthal direction 364. In various examples, the stiffness of the body 351 can be correlated with the thickness of the body 351. For instance, the body 351 can be stiffer along the radially outer edge 356 than the radially inner edge 354 when the radially outer edge 356 is thicker than the radially inner edge 354. In some examples, changing the thickness of the body 351 can change the stiffness of the body 351. For instance, increasing the thickness of the body 351 will increase the stiffness of the body 351 when compared to a similar body 351 with an unchanged thickness. In some examples, the stiffness of the body 351 increases from the radially inner edge 354 to the radially outer edge 356 along the first azimuthal direction 362. For instance, the stiffness of the body 351 can increase as the thickness of the body 351 increases from the radially inner edge 354 to the radially outer edge 356. In various examples, the stiffness of the body 351 increases from the radially inner edge 354 to the radially outer edge 356 along the second azimuthal direction 362. For instance, the stiffness of the body 351 can increase as the thickness of the body 351 increases from the radially inner edge 354 to the radially outer edge 356.

While various examples herein describe controlling the stiffness of the body 351 by varying its thickness, in some examples the stiffness can be controlled using other approaches. For example, varying the material composition across different regions of the body (e.g., with a higher concentration of certain materials in one region than another), the use of surface coatings to increase stiffness in select regions, or the presence of reinforcing structural elements such as ribs, may also be used to achieve varying stiffness across the body 351.

By varying the thickness and/or stiffness of the body 351, the amount of displacement a diaphragm 350 experiences when a force is applied to the diaphragm 350 can be desirably changed relative to a similar conventional diaphragm with a constant thickness. For example, if the diaphragm 350 experiences a large amount of nonlinear displacement at breakup frequencies at the radially outer edge 356, the thickness at the radially outer edge 356 can be increased to reduce the amount of the nonlinear displacement experienced at the radially outer edge 356. When the diaphragm 350 is installed within the transducer 314 (e.g., coupled to the voice coil 324 and the surround 326), the diaphragm 350 can become more rigid due to coupling with the other components of the transducer 314. For example, coupling the voice coil 324 to the diaphragm 350 at the radially inner edge 354 can increase the rigidity of the diaphragm at the radially inner edge 354, and thus, make the radially inner edge 354 less susceptible to undesirable nonlinear displacement at specific frequencies. In some of these examples, or otherwise, the diaphragm 350 experiences the most displacement at a location spaced away from radially inner edge 354 (where the diaphragm couples to the voice coil 324) and the radially outer edge 356 (where the diaphragm couples to surround 326). Accordingly, in some examples, increasing the thickness and stiffness of the body 351 at a location spaced away from radially inner edge 354 and radially outer edge 356 can reduce the amount of displacement the diaphragm 350 experiences at a given frequency.

In some examples, different locations along the body 351 can be prone to experience displacement differently. For instance, the radially outer edge 356 can be more prone to experience displacement at the major axis 360 than at the minor axis 358, as the body 351 is more compact and/or rigid along the minor axis 358 than at the major axis 360. Accordingly, in some of these examples, or otherwise, the thickness and stiffness of the body 351 can be varied to accommodate for the expected displacement of the body 351. For instance, the body 351 can be thicker and stiffer along the second azimuthal direction 364 than along the first azimuthal direction 362, as the body 351 can be more prone to displacement along the second azimuthal direction 364 than the first azimuthal direction 362. In some examples, the circumferential axis 378 of body 351 can be thicker at the intersection of the major axis 360 than at the intersection of the minor axis 358, as the body 351 can be more prone to displacement along the major axis 360 than the minor axis 358. In various examples, the thickness and stiffness of the body 351 along an azimuthal direction and along a circumferential axis can vary to accommodate for displacement.

In some examples, one or more first portions of the body 351 can have their thicknesses and stiffnesses increased while one or more separate second portions of the body 351 can have their thicknesses and stiffnesses decreased. The thickness(es) and stiffness(es) can be increased or decreased at different points along the body 351 so as to maintain the weight of the body 351. For instance, by increasing the thickness of the body 351 along the radially outer edge 356 and decreasing the thickness of the body 351 at the radially inner edge 354, the overall weight of the body 351 can be maintained as if no adjustments to the thicknesses of the body 351 were made. In some examples, the thickness and stiffness of the body 351 can be increased at locations along the body 351 that are prone to high displacement while the thickness and stiffness of the body 351 can be decreased at locations along the body 351 that are not prone to high displacement. For example, the thickness and stiffness of the body 351 can be increased near an intermediate portion 370 of the body 351 while the thickness and stiffness near the radially inner edge 354 can be decreased.

In some examples, the body 351 is formed from or at least includes plastic (e.g., polypropylene). In various examples, the body 351 is formed from or at least includes paper. In some examples, the body is formed from or at least includes a metal (e.g., aluminum, beryllium) and/or a metal alloy. As will be described in further detail below, in some examples, the body 351 is formed using injection molding. In various examples, the body can be formed from stamping, thermoforming, or any other suitable manufacturing technique.

Figure 4:
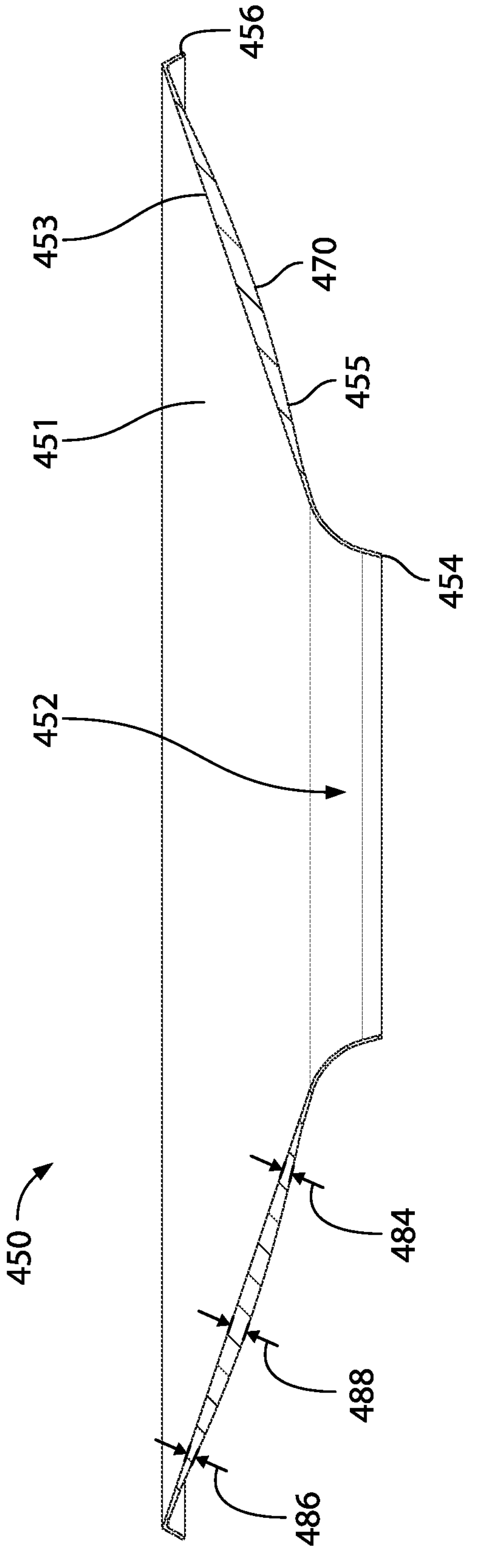
FIG. 4 is a side sectional view of a diaphragm configured in accordance with examples of the disclosed technology.

FIG. 4 is a side sectional view of a diaphragm 450. The diaphragm 450 can be generally similar in many respects to the diaphragm 350 described elsewhere herein, except that the diaphragm 450 has a thickness that varies non-monotonically along one or more axes or directions (e.g., the thickness increases and then decreases along a given direction). As shown in FIG. 4, the diaphragm 450 can be defined by a body 451 which extends between a radially inner edge 454 and a radially outer edge 456. An aperture 452 can be formed at the center of the body 451. The body 451 can include an inner surface 453 and an outer surface 455 opposite the inner surface 453. The inner surface 453 and outer surface 455 can extend between the radially inner edge 454 and radially outer edge 456 of the body 451. The body 451 can form an elliptical frustum shape, with the body 451 extending upwards and outwards from the radially inner edge 454 to the radially outer edge 456. In some examples, the body 451 can form a conical shape.

The body 451 can have a range of thicknesses extending from the radially inner edge 454 to the radially outer edge 456. As illustrated in FIG. 4, the thicknesses can vary in a nonlinear manner. For example, the body 451 can have a first thickness 484 near the radially inner edge 454, a second thickness 486 near the radially outer edge 456, and a third thickness 488 between the first thickness 484 and second thickness 486, with the third thickness 488 being larger than the first and second thicknesses 484, 486. In some examples, the body 451 can have a nonlinear thickness to counteract any displacement that could be experienced at specific portions along the body 451. For instance, as illustrated in FIG. 4, the body 451 can counteract any displacement experienced near an intermediate portion 470 of the body 451, as the intermediate portion 470 of the body 451 is thicker and/or stiffer than the surrounding portions of the body 451.

Figure 5:
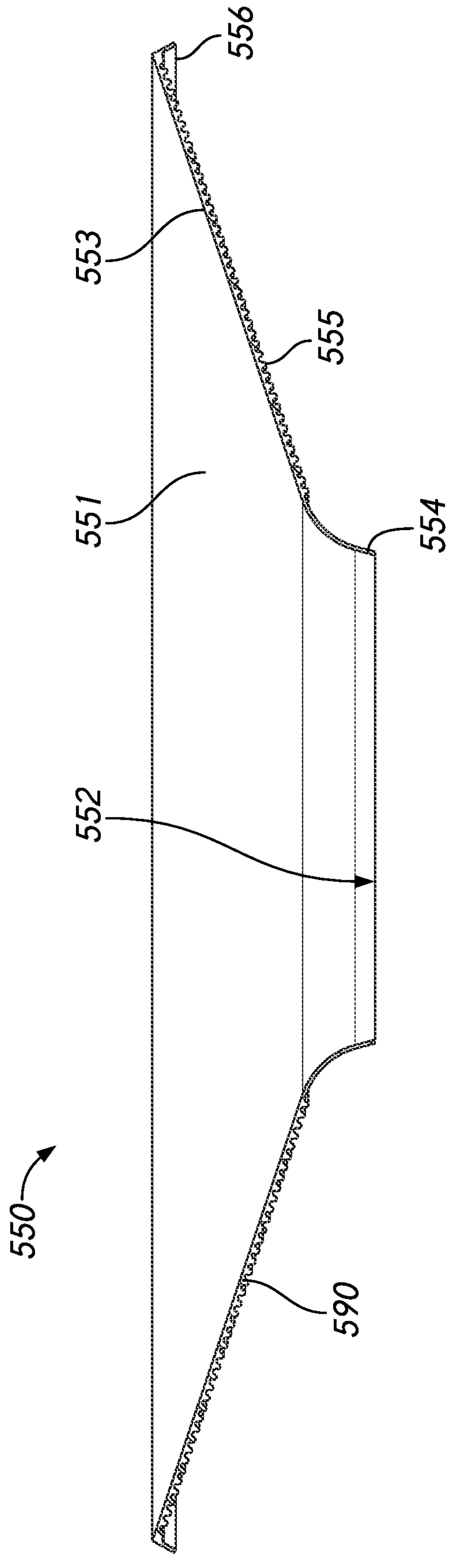
FIG. 5 is a side sectional view of a diaphragm configured in accordance with examples of the disclosed technology.

FIG. 5 is a side cross-sectional view of a diaphragm 550. The diaphragm 550 can be generally similar in many respects to the diaphragm 350 (FIG. 3A-3F) and the diaphragm 450 (FIG. 4) described elsewhere herein. The diaphragm 550 can be defined by a body 551 which extends between a radially inner edge 554 and a radially outer edge 556. An aperture 552 can be formed at the center of the body 551. The body 551 can include an inner surface 553 and an outer surface 555 opposite the inner surface 553. The inner surface 553 and outer surface 555 can extend between the radially inner edge 554 and radially outer edge 556 of the body 551. The body 551 can form an elliptical frustum shape, with the body 551 extending upwards and outwards from the radially inner edge 554 to the radially outer edge 556. In some examples, the body 551 can form a conical shape.

As illustrated in FIG. 5, the body 551 can include a periodic edge 590 along a portion of the outer surface 555. The periodic edge 590 can form small peaks and valleys along the length of the periodic edge 590. In some examples, the periodic edge 590 can extend around the entire circumferential axis of the body 551. In various examples, the periodic edge 590 extends around only a portion of the body 551. In some examples, the periodic edge 590 can increase the stiffness of the body 551 along the periodic edge 590 without needing to uniformly increase the thickness of the body 551 along the same azimuthal direction.

Figure 6:
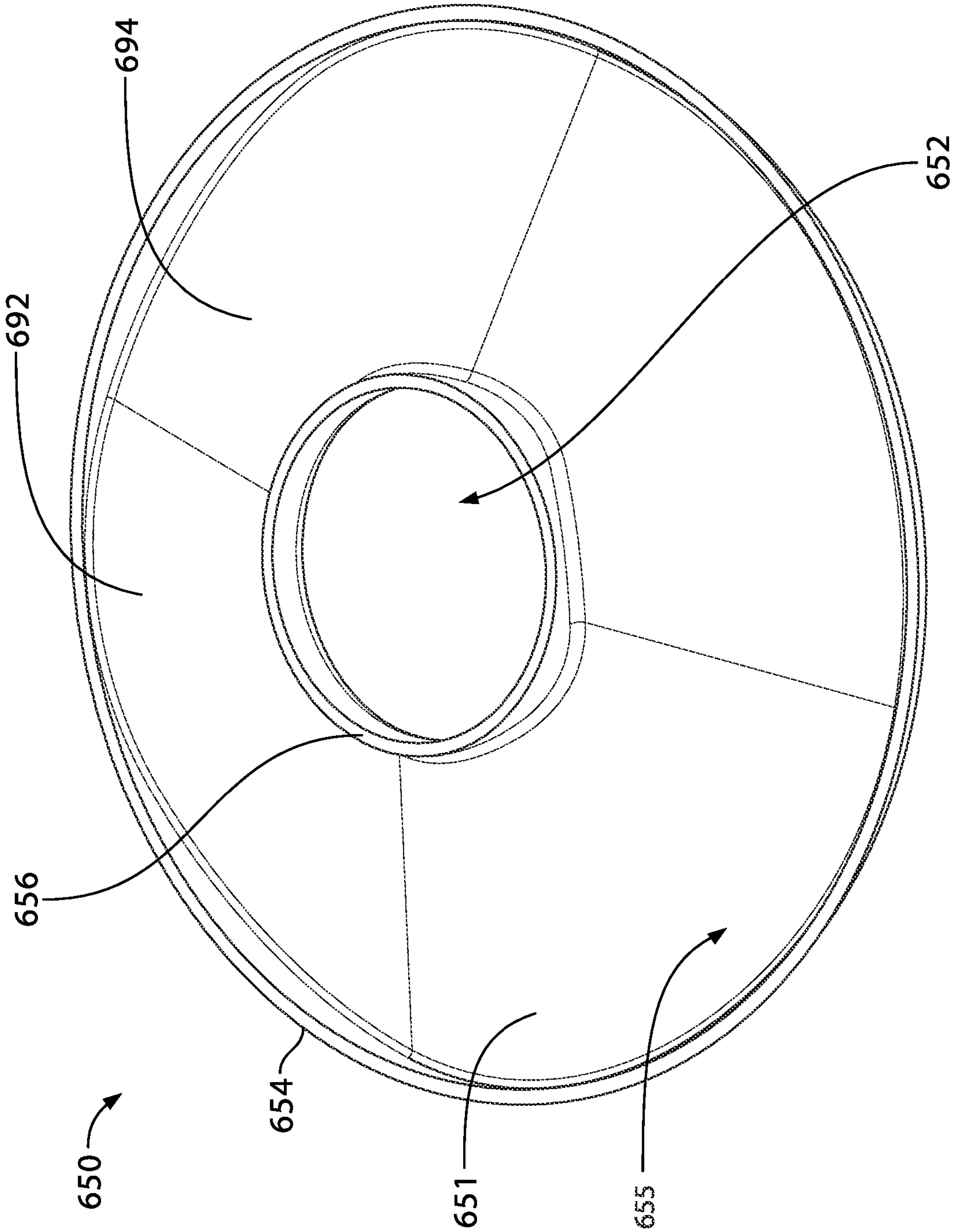
FIG. 6 is a bottom isometric view of a diaphragm configured in accordance with examples of the disclosed technology.

FIG. 6 is a bottom isometric view of a diaphragm 650. The diaphragm 650 can be generally similar in many respects to the diaphragm 350 (FIGS. 3A-3F), the diaphragm 450 (FIG. 4), and the diaphragm 550 (FIG. 5) described elsewhere herein. The diaphragm 650 can be defined by a body 651 which extends between a radially inner edge 654 and a radially outer edge 656. An aperture 652 can be formed at the center of the body 651. The body 651 can include an inner surface (not pictured) and an outer surface 655 opposite the inner surface. The inner surface and outer surface 655 can extend between the radially inner edge 654 and radially outer edge 656 of the body 651. The body 651 can form an elliptical frustum shape, with the body 651 extending upwards and outwards from the radially inner edge 654 to the radially outer edge 656. In some examples, the body 651 can form a conical shape.

As illustrated in FIG. 6, the body 651 can form a continuous wave structure along the outer surface 655. In some examples, the wave can be defined by one or more peaks 692 and one or more valleys 694 arranged on the outer surface 655 of the body 651. In some examples, the peaks 692 can be formed by areas of greater thickness of the body 651 at the peak 692 and/or forming the inner surface and outer surface 655 along a wavelike profile. In various examples, the valleys 694 can be formed by areas of smaller thickness of the body 651 at the valley 694 and/or forming the inner surface and outer surface 655 along a wavelike profile. In operation, the peaks 692 and valleys 694 control the thickness and therefore the stiffness of the diaphragm 650, and can be configured such that the breakup frequency is higher than it would be with a uniform thickness and/or stiffness along the diaphragm 650.

Figure 7A:
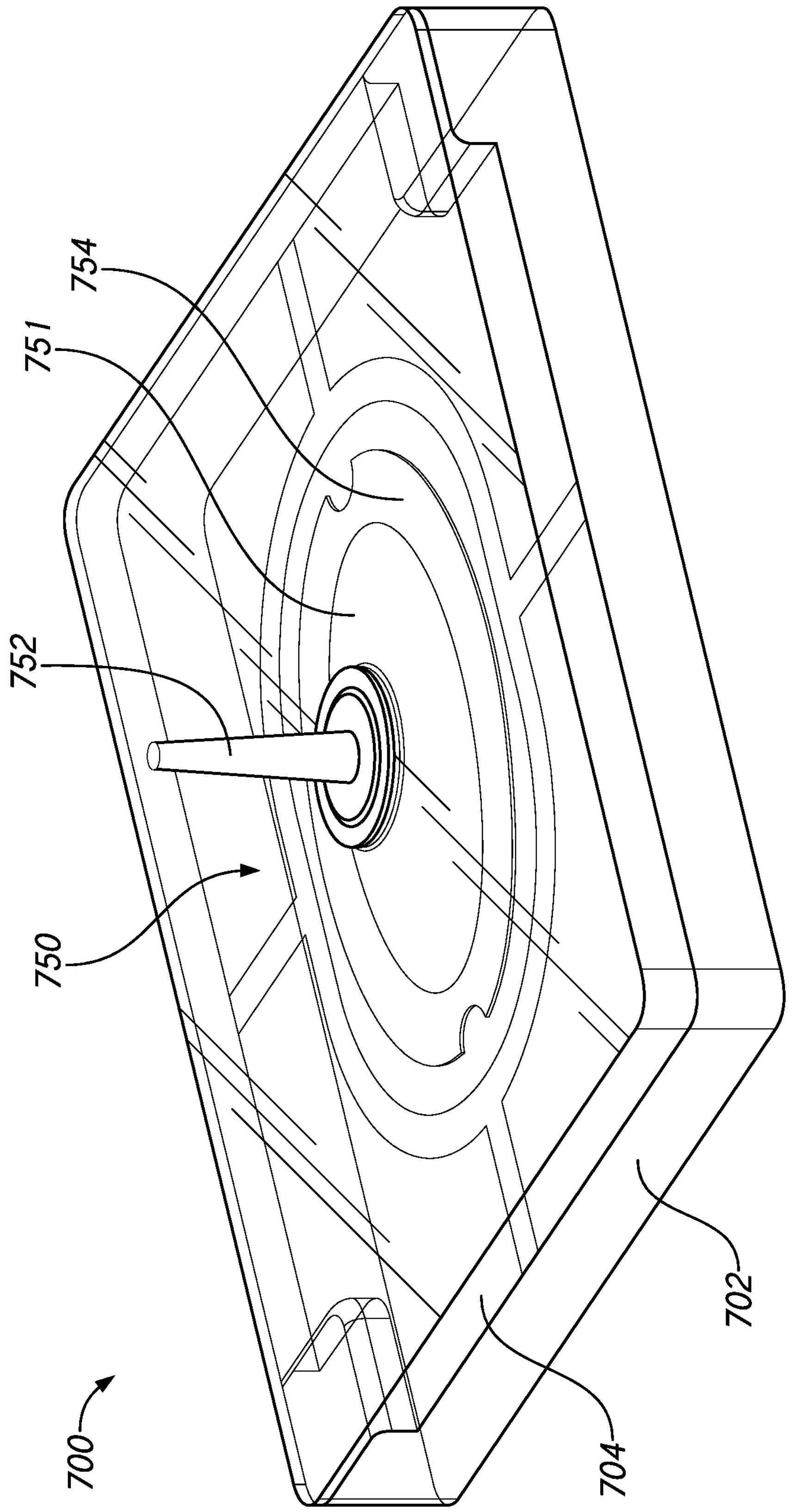
FIG. 7A is a top isometric view of a diaphragm former configured in accordance with examples of the disclosed technology.
Figure 7B:
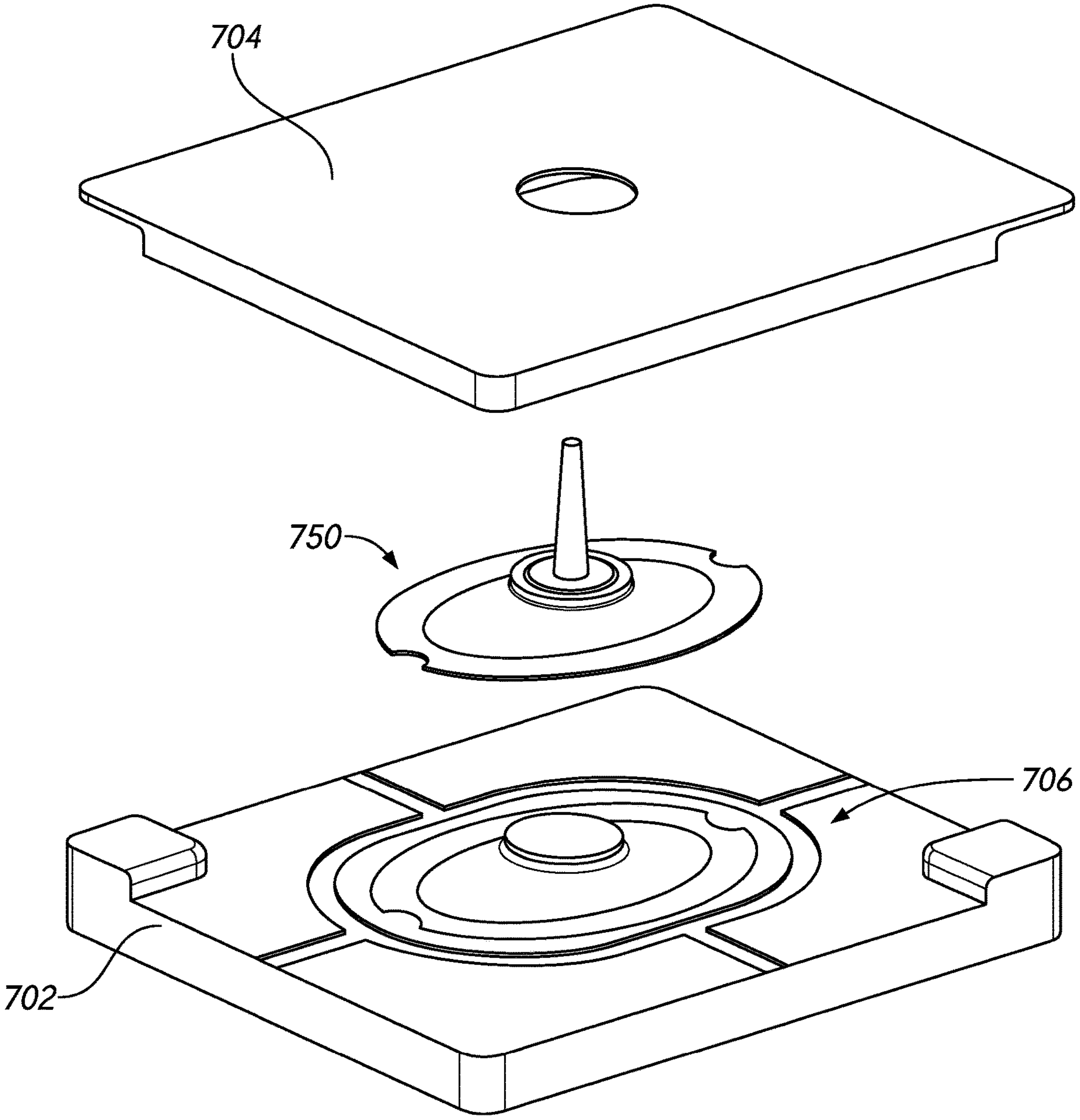
FIG. 7B is an exploded view of the diaphragm former of FIG. 7A.
Figure 7C:
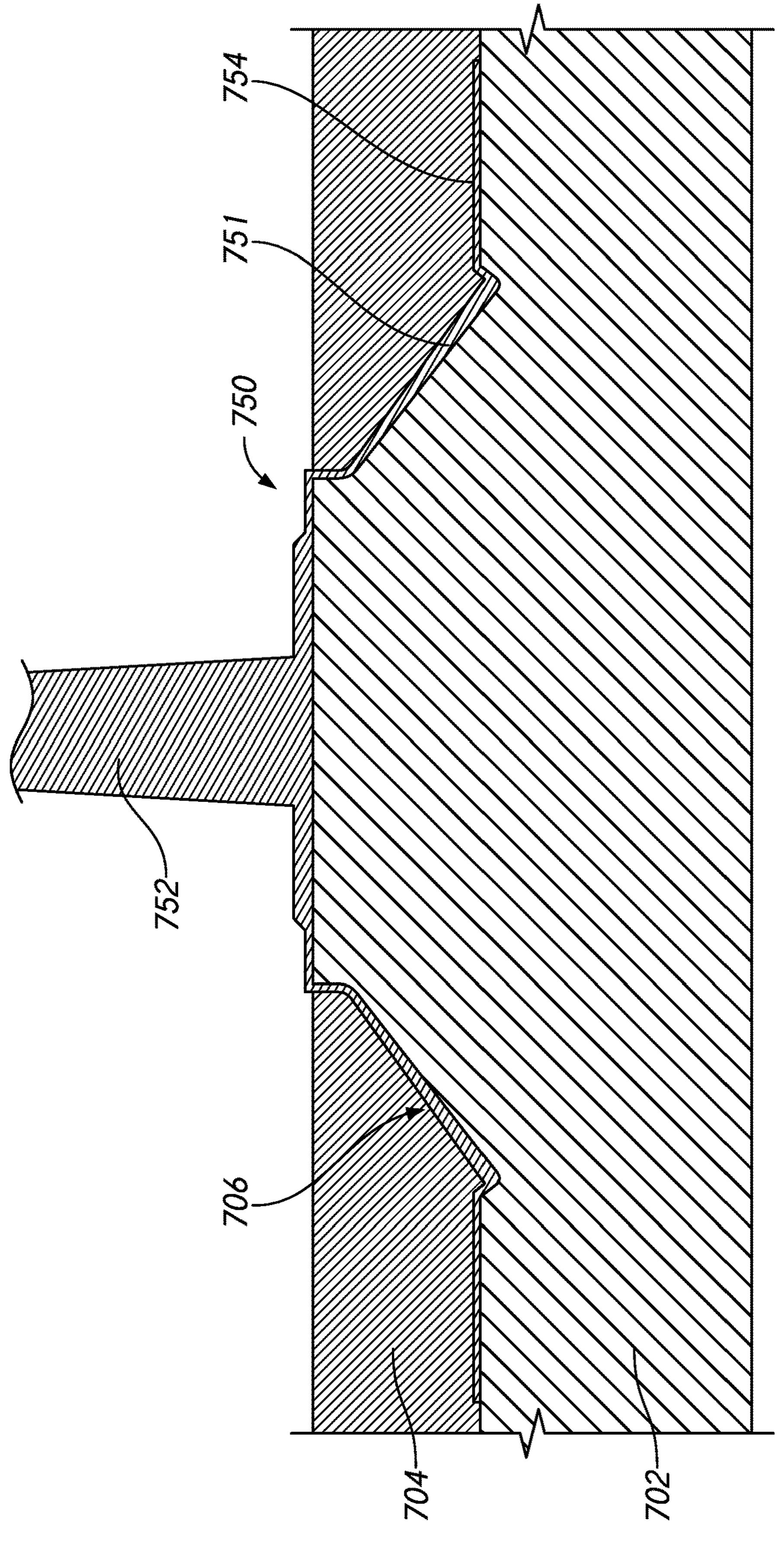
FIG. 7C is a cross-sectional side view of the diaphragm former of FIG. 7A.
Figure 7D:
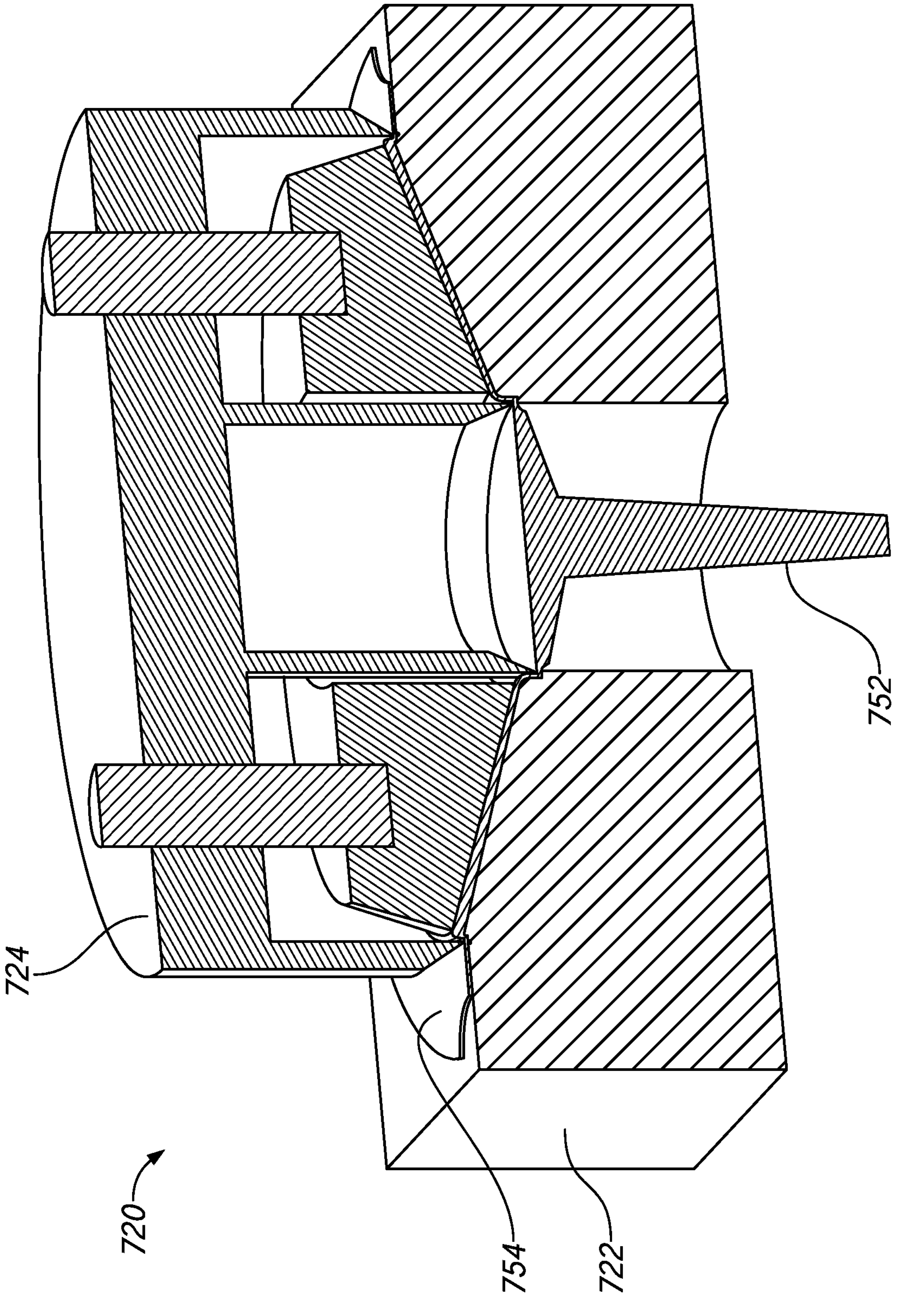
FIG. 7D is a cross-sectional isometric view of a diaphragm cutter configured in accordance with examples of the disclosed technology.

As noted previously, a variety of different techniques can be used to manufacture a diaphragm in accordance with the present technology. FIGS. 7A-7D illustrate one exemplary technique that includes injection molding. FIG. 7A is a top isometric view of a diaphragm former 700 with the upper mold 704 partially hidden for clarity. FIG. 7B is an exploded view of the diaphragm former 700 from FIG. 7A. FIG. 7C is a cross-sectional side view of the diaphragm former 700 from FIG. 7A. FIG. 7D is a cross-sectional isometric view of a diaphragm cutter 720. Referring to FIGS. 7A-7D together, the diaphragm former 700 comprises a lower mold 702 and an upper mold 704. The lower mold 702 can detachably couple with the upper mold 704. When coupled together, the lower mold 702 and upper mold 704 can form a chamber 706 that is defined by the space between the lower mold 702 and upper mold 704. The diaphragm 750 can be formed by injecting flowable material into the chamber 706 to occupy the space between the lower mold 702 and upper mold 704. Once the flowable material has cured, the resulting diaphragm 750 includes a body 751 with a handle 752 and a flange 754 extending off the body 751. The handle 752 and flange 754 can be removed from the diaphragm 750 through the diaphragm cutter 720 (FIG. 7D). The diaphragm cutter 720 can include a cutting block 722 and a cutter 724 spaced apart from the cutting block 722. The cutting block 722 can be used to hold a diaphragm 750 in place. The cutter 724 can be pressed against the cutting block 722 so that one or more edges from the cutter 724 can remove material from the diaphragm 750.

When forming a diaphragm 750, the lower mold 702 is coupled to the upper mold 704 to form the chamber 706. A material in fluid form (for example, plastic, metal, etc.) is injected into the diaphragm former 700 through a nozzle so that the fluid material occupies the chamber 706. The lower mold 702 and upper mold 704 hold the fluid material within the chamber 706 so that the fluid material can cool and solidify. As the fluid material cools and solidifies, the material takes the shape of the chamber 706 and forms the body 751, handle 752, and flange 754 of the diaphragm 750. In some examples, an additional mold (not pictured) can be placed on top of the diaphragm former 700 to form the handle 752 (e.g., define a chamber to hold a liquid material until it solidifies into the handle 752). In various examples, the nozzle used to inject the fluid material into the chamber 706 can be used to form the handle 752. After the material solidifies, the diaphragm 750 is positioned on the cutting block 722 of the diaphragm cutter 720 so that the diaphragm 750 is positioned between the cutting block 722 and the cutter 724. The cutter 724 can be pressed into the cutting block 722, separating the handle 752 and flange 754 from the body 751. The remaining body 751 of the diaphragm 750 can then be used in an assembly for an audio transducer (e.g., transducer 214, and/or transducer 314).

The diaphragm former 700 can form several diaphragms with a variety of different sizes and/or shapes. For example, the diaphragm former 700 can be used to form a diaphragm with a varying thickness, such as the diaphragm 350. The chamber 706 can be sized in a specific manner so that a diaphragm formed with the diaphragm former 700 can have a particular thickness, shape, and/or feature. For example, the upper mold 704 and lower mold 702 can be dimensioned and configured to define a chamber 706 having the appropriate dimensions (e.g., with a variable thickness as defined by the vertical gap between the upper mold 704 and the lower mold 702). Accordingly, the diaphragm former 700 can be used to form the diaphragm 450, the diaphragm 550, and the diaphragm 650.

Figure 8:
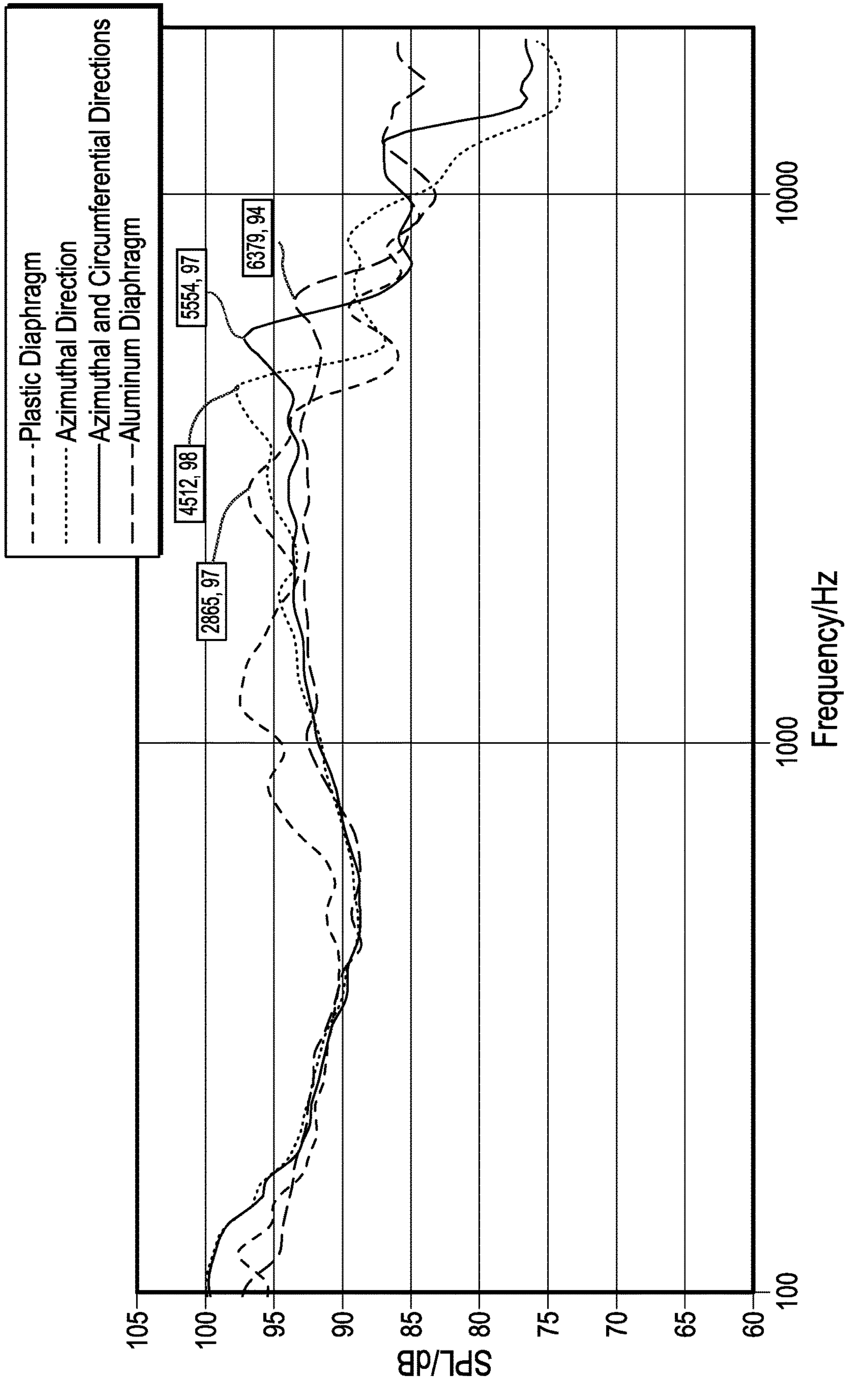
FIG. 8 illustrates a graph of the frequency response of several diaphragms configured in accordance with examples of the disclosed technology.

As noted elsewhere herein, variable-stiffness diaphragms can be configured to achieve a higher breakup frequency than would be possible using a uniform stiffness and/or uniform thickness diaphragm, thereby achieving a higher upper limit for high-frequency audio playback without the audible distortion accompanying breakup. FIG. 8 illustrates a graph of the frequency response for several example diaphragms. The Y-axis of the graph illustrates the sound pressure level ("SPL") of a diaphragm in decibels ("dB"). The X-axis of the graph illustrates the applied frequency to the diaphragm in Hertz ("Hz"). Four different diaphragms are charted in the graph. These diaphragms have a similar size (e.g., length and width) and a similar weight, but vary in thickness and material. The charted "Plastic Diaphragm" shows the frequency response of a plastic diaphragm with a uniform thickness. The charted "Azimuthal Direction" shows the frequency response of a plastic diaphragm with the thickness and stiffness varying in an azimuthal direction. The charted "Azimuthal and Circumferential Direction" shows the frequency response of a plastic diaphragm with the thickness and stiffness varying in an azimuthal direction and circumferential direction. The charted "Aluminum Diaphragm" shows the frequency response of an aluminum diaphragm with a uniform thickness.

As can be seen in the graph, the "Plastic Diaphragm" has a breakup frequency at 2865 Hz, the "Azimuthal Direction" diaphragm has a breakup frequency at 4512 Hz, the "Azimuthal and Circumferential Direction" diaphragm has a breakup frequency at 5554 Hz, and the "Aluminum Diaphragm" has a breakup frequency at 6379 Hz. Accordingly, by adjusting the thickness and stiffness of a plastic diaphragm in the azimuthal direction and circumferential direction, the breakup frequency of a plastic diaphragm can be extended from 2865 Hz to 5554 Hz and achieve a similar performance to an aluminum diaphragm, which is significantly more expensive, heavier, and more difficult to manufacture.

As noted above, the thickness of the diaphragm can be an important determinant of its acoustic performance. Accordingly, it can be beneficial to reliably and accurately measure the thickness of manufactured diaphragms. Conventionally, a thickness gauge is used to measure the thickness of a diaphragm with uniform thickness. However, in the case of a variable-thickness diaphragm, the particular measurement location is important to obtain precise and comparable thickness measurements across multiple diaphragms. The thickness gauge probe's orientation also plays an important role on the accuracy of the thickness measurement. Both the position and orientation of the gauge probe can be difficult to control on a light speaker diaphragm.

To address these and other problems, the present technology provides a measuring device configured to retain punched samples of a variable-thickness diaphragm for accurate, consistent, and repeatable measurement using a conventional thickness gauge. In some implementations, this measurement method with the presented fixtures can provide about 0.001-0.002 mm standard deviation on a 0.4 mm nominal thickness (in a range of 0.3 to 0.6 mm) and the Cp (process capability) can be between about 4-10.

Figure 9:
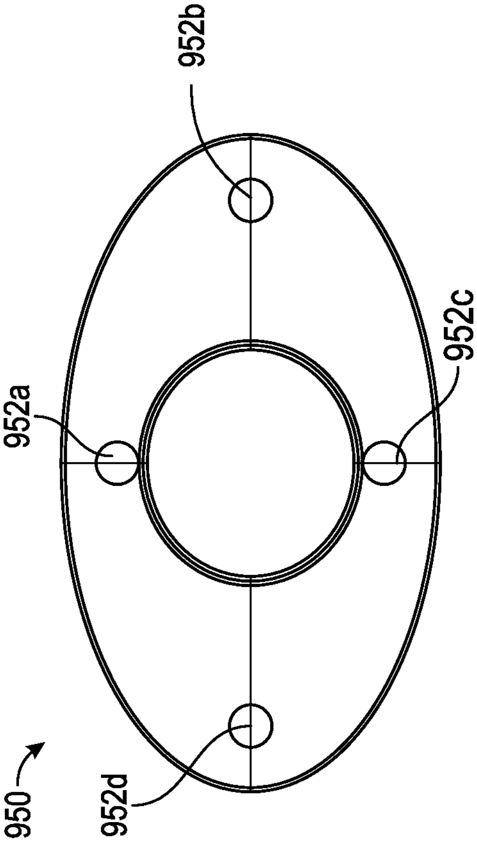
FIG. 9 is a top view of a diaphragm with samples for measuring thickness in accordance with examples of the disclosed technology.

FIG. 9 is a top view of a diaphragm 950 with samples 952*a-d* for measuring thickness in accordance with examples of the disclosed technology. To generate the samples, a circular punch can be applied to the raw part out of injection molding before the flange is trimmed. Positioning pillars (not shown) can be used to lock the raw part in position by the recess at the long axis ends, so that the punching is only applied at fixed positions on both long and short axes. This allows the samples 952 to be taken at consistent locations across multiple diaphragms.

Figure 10:
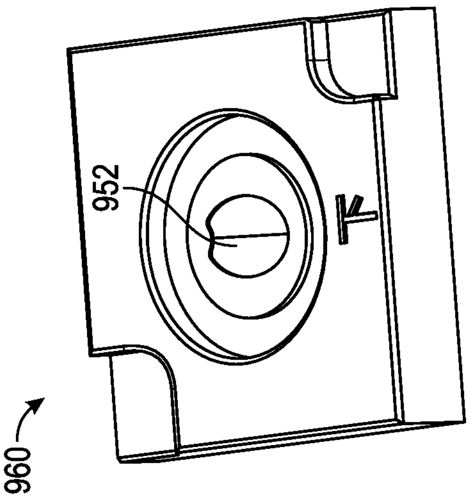
FIG. 10 is a top perspective view of a lower fixture for measuring thickness of diaphragm samples.
Figure 11B:
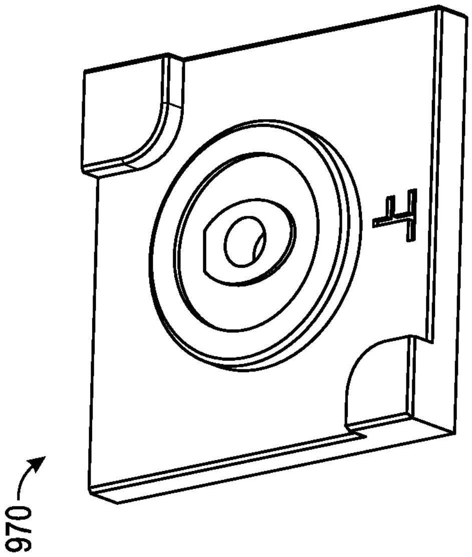
FIGS. 11A and 11B are top and bottom perspective views, respectively, of an upper fixture for measuring thickness of diaphragm samples.
Figure 11A:
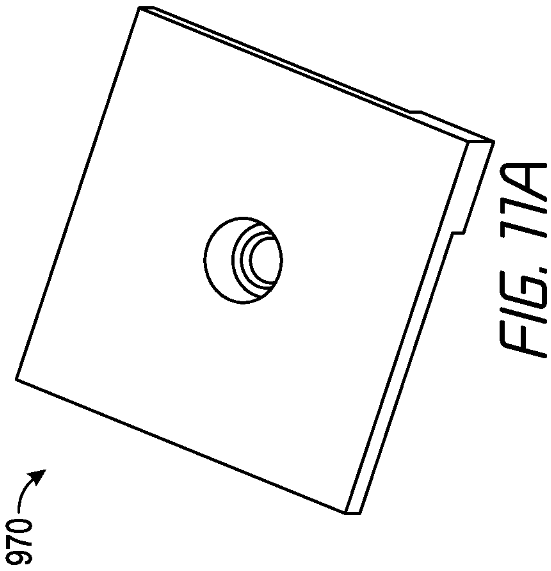

These samples 952 can be held in place via a measuring device that includes a lower fixture 960 (FIG. 10) and an upper fixture 970 (FIGS. 11A and 11B), which allows the samples 952 to be accurately measured via a conventional thickness gauge. As seen in FIG. 10, the lower fixture 960 can include a central aperture configured to receive the sample 952 therein. The sample 952 can initially have a circular shape as seen from the top view, while it is elliptical if placed on a flat surface due to the contour of the diaphragm 950. Two spall portions on each of a long axis and short axis can be trimmed off by the same punching tool with flat ends, such that the samples 952 are no longer circular. The two flat ends are used to lock the samples 952 in position in the lower fixture 960 so that the samples 952 are always measured at the same position for thickness. In some examples, the punched portions along the long axis (952*b* and 952*d*) and the punched portions along the short axis (952*a* and 952*c*) may have different fixtures for the thickness measurement. The lower fixture 960 can also include two ears at the top of the receptacle to host the sample 952. These can be used to insert and remove the samples 952 during the measurement. As shown in FIGS. 11A and 11B, the upper fixture 970 can include an aperture 972 configured to receive a thickness gauge probe therethrough. The upper fixture 970 and lower fixture 960 can mate together by use of corresponding protrusions and recesses, which may be asymmetrical to ensure that the fixtures are only mated in a particular orientation.

Figure 12:
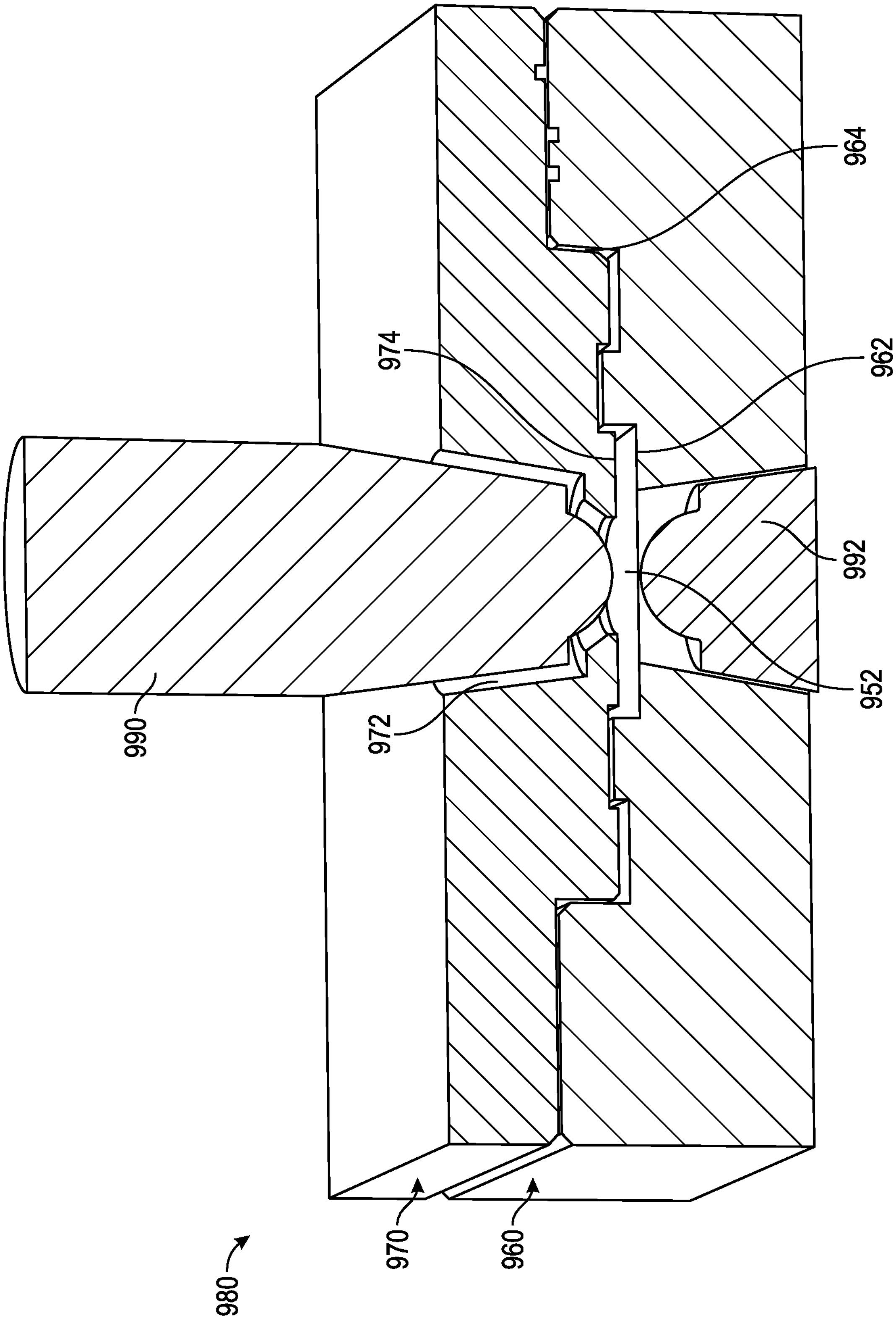
FIG. 12 is a perspective cross-sectional view of a device for measuring thickness in accordance with examples of the disclosed technology.

FIG. 12 is a perspective cross-sectional view of the assembled measuring device 980 that includes the upper fixture 970 mated with the lower fixture 960. An upper probe 990 of a thickness gauge extends through the aperture 972 in the upper fixture to contact the sample 952, which is supported by the lower fixture 960. A lower probe 992 of the thickness gauge extends through the cone chamfer 982 in the lower fixture 960, such that both the upper probe 990 and the lower probe 992 can contact opposing sides of the sample 952 at a center region of the sample 952. To ensure the lower probe 992 always contacts the sample 952, a small clearance (e.g., about 0.03 mm) can be applied between the upper face of the lower fixture 960 and the upper tip of the lower probe 992, such that the tip of the lower probe 992 is higher (e.g., about 0.03 mm higher) than the upper surface 962 of the lower fixture 960.

A chamber 964 at the interface of the upper fixture 970 and lower fixture 960 can be used to allow the two fixtures to be slidably mated together into a locked position to press the sample 952. The upper surface 962 of the lower fixture 960 can be sized and configured to correspond to the opposing lower surface 974 of the upper fixture 970. This can provide a balanced weight in the top fixture 970 pressing downward on the sample 952.

The aperture 972 of the upper fixture 970 can have a clearance of approximately 1 mm around the tip of the upper probe 990, such that the tip probe need not contact the upper fixture 972, but rather reliably and consistently contacts the surface of the sample 952 to measure the sample's thickness.

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A diaphragm for an audio transducer, the diaphragm comprising: an annular body defining a central aperture; a first surface of the body extending between a radially inner edge adjacent the aperture and a radially outer edge; and a second surface of the body opposite the first surface, the second surface extending between the radially inner edge and the radially outer edge, wherein along a first azimuthal direction, the body has a first range of thicknesses extending between the first surface and the second surface, the first range of thicknesses comprising a first thickness adjacent the radially inner edge and a second thickness adjacent the radially outer edge, the first thickness being different from the second thickness, and wherein along a second azimuthal direction, the body has a second range of thicknesses extending between the first surface and the second surface, the second range of thicknesses comprising a third thickness adjacent the radially inner edge and a fourth thickness adjacent the radially outer edge, the third thickness being different from the fourth thickness.

Example 2. The diaphragm of Example 1, wherein the body is longer along the first azimuthal direction than the second azimuthal direction.

Example 3. The diaphragm of any one of the proceeding Examples, wherein the first range of thicknesses increases in thickness from the radially inner edge to the radially outer edge along the first azimuthal direction.

Example 4. The diaphragm of any of the preceding Examples, wherein the first range of thickness varies nonuniformly in thickness from the radially inner edge to the radially outer edge along the first azimuthal direction.

Example 5. The diaphragm of any of the preceding Examples, wherein the first thickness is smaller than the third thickness.

Example 6. The diaphragm of any of the preceding Examples, wherein the second thickness is smaller than the fourth thickness.

Example 7. The diaphragm of any of the preceding Examples, wherein the first range of thicknesses is at its maximum thickness at a location spaced apart from the radially inner edge and the radially outer edge.

Example 8. The diaphragm of any of the preceding Examples, wherein the body is conical shaped.

Example 9. The diaphragm of any of the preceding Examples, wherein the body comprises a plastic.

Example 10. A diaphragm for an audio transducer, the diaphragm comprising: an annular body defining a central aperture; a first surface of the body extending between a radially inner edge adjacent the aperture and a radially outer edge; and a second surface of the body opposite the first surface, the second surface extending between the radially inner edge and the radially outer edge, wherein along a first azimuthal direction, the body has a first range of stiffnesses extending between the radially inner edge and the radial outer edge, the first range of stiffnesses comprising a first stiffness adjacent the radially inner edge and a second stiffness adjacent the radially outer edge, the first stiffness being different from the second stiffness, and wherein along a second azimuthal direction, the body has a second range of stiffnesses extending between the radially inner edge and the radially outer edge, the second range of stiffnesses comprising a third stiffness adjacent the radially inner edge and a fourth stiffness adjacent the radially outer edge, the third stiffness being different from the fourth stiffness.

Example 11. The diaphragm of Example 10, wherein along the first azimuthal direction, the body comprises a range of thicknesses extending between the first surface and the second surface, the range of thicknesses comprising a first thickness adjacent the radially inner edge and a second thickness adjacent the radially outer edge.

Example 12. The diaphragm of Examples 11, wherein the first thickness is different from the second thickness.

Example 13. The diaphragm of any of the Examples 10-12, wherein the first range of stiffnesses is at its maximum stiffness at a location spaced apart from the radially inner edge and the radial outer edge.

Example 14. The diaphragm of any of the Examples 10-13, wherein the annular body is conical shaped.

Example 15. The diaphragm of any of the Examples 10-14, wherein the annular body comprises plastic.

Example 16. A diaphragm for an audio transducer, the diaphragm comprising: an annular body defining a central aperture and a circumferential axis surrounding the aperture; a first surface extending between a radially inner edge adjacent the aperture and a radially outer edge; a second surface opposite the first surface, the second surface extending between the radially inner edge and the radially outer edge; and a thickness extending between the first surface and the second surface, the thickness varying along the circumferential axis.

Example 17. The diaphragm of Example 16, wherein along a first azimuthal direction, the body has a first range of thicknesses extending between the first surface and the second surface, the first range of thicknesses comprising a first thickness adjacent the radially inner edge and a second thickness adjacent the radially outer edge, the first thickness being different from the second thickness.

Example 18. The diaphragm of Example 17, wherein along a second azimuthal direction, the body has a second range of thicknesses extending between the first surface and the second surface, the second range of thicknesses comprising a third thickness adjacent the radially inner edge and a fourth thickness adjacent the radially outer edge, the third thickness being different from the fourth thickness.

Example 19. The diaphragm of any of the Examples 16-18, wherein the body is formed from plastic.

Example 20. An audio transducer, comprising: a frame; a diaphragm comprising: a first surface extending between a radially inner edge and a radially outer edge, the radially inner edge surrounding a center aperture; and a second surface opposite the first surface, the second surface extending between the radially inner edge and the radially outer edge; and wherein along a first azimuthal direction, the diaphragm has a first range of thicknesses extending between the first surface and the second surface, the first range of thicknesses comprising a first thickness adjacent the radially inner edge and a second thickness adjacent the radially outer edge, the first thickness being different from the second thickness, and wherein along a second azimuthal direction, the diaphragm has a second range of thicknesses extending between the first surface and the second surface, the second range of thicknesses comprising a third thickness adjacent the radially inner edge and a fourth thickness adjacent the radially outer edge, the third thickness being different from the fourth thickness; a surround resiliently coupling the radially outer edge of the diaphragm to the frame; a magnet attached to the frame; and a voice coil adjacent the magnet and operably coupled to the diaphragm, wherein the voice coil is configured to receive a flow of electric signals from an amplifier, and, in response to the received flow of electric signals, correspondingly move the diaphragm axially inward and outward with respect to the frame, thereby producing sound waves.

Example 21. The audio transducer of Example 20, wherein the sound waves have a cutoff frequency between about 3 kilohertz (kHz) and about 7 kHz.

Example 22. The audio transducer of Example 20 or 21, further comprising a dust cap configured to substantially axially overlap the center aperture.

Example 23. The audio transducer of any of the Examples 20-22, wherein the diaphragm is longer along the first azimuthal direction than the second azimuthal direction.

Example 24. The audio transducer of any of the Examples 20-23, wherein the first range of thicknesses increases in thickness from the radially inner edge to the radially outer edge along the first azimuthal direction.

Example 25. The audio transducer of any of the Examples 20-24, wherein the first range of thickness varies non-uniformly in thickness from the radially inner edge to the radially outer edge along the first azimuthal direction.

Example 26. The audio transducer of any of the Examples 20-25, wherein the first thickness is smaller than the third thickness.

Example 27. The audio transducer of any of the Examples 20-26, wherein the second thickness is smaller than the fourth thickness.

Example 28. The audio transducer of any of the Examples 20-27, wherein the first range of thicknesses is at its maximum thickness at a location spaced apart from the radially inner edge and the radially outer edge.

Example 29. The audio transducer of any of the Examples 20-28, wherein the diaphragm is conical shaped.

Example 30. The audio transducer of any of the Examples 20-29, wherein the diaphragm comprises a plastic.

Example 31. A playback device comprising: an enclosure; and an audio transducer carried by the enclosure, the audio transducer comprising: a frame; a diaphragm comprising: a first surface extending between a radially inner edge and a radially outer edge, the first surface defining a first radial axis and a second radial axis substantially perpendicular to the first radial axis; and a second surface opposite the first surface, the second surface extending between the radially inner edge and the radially outer edge, wherein along a first azimuthal direction, the diaphragm has a first range of thicknesses extending between the first surface and the second surface, the first range of thicknesses comprising a first thickness adjacent the radially inner edge and a second thickness adjacent the radially outer edge, the first thickness being different from the second thickness, and wherein along a second azimuthal direction, the diaphragm has a second range of thicknesses extending between the first surface and the second surface, the second range of thicknesses comprising a third thickness adjacent the radially inner edge and a fourth thickness adjacent the radially outer edge, the third thickness being different from the fourth thickness; a surround resiliently coupling the radially outer edge of the diaphragm to the frame; a magnet attached to the frame; and a voice coil adjacent the magnet and operably coupled to the diaphragm, wherein the voice coil is configured to receive a flow of electric signals from an amplifier, and, in response to the received flow of electric signals, correspondingly move the diaphragm axially inward and outward with respect to the frame, thereby producing sound waves.

Example 32. The playback device of Example 31, wherein the sound waves have a cutoff frequency between about 3 kilohertz (kHz) and about 7 kHz.

Example 33. The playback device of Examples 31 or 32, further comprising a dust cap configured to substantially axially overlap a center aperture.

Example 34. The playback device of any of the Examples 31-33, wherein the diaphragm is longer along the first azimuthal direction than the second azimuthal direction.

Example 35. The playback device of any of the Examples 31-34, wherein the first range of thicknesses increases in thickness from the radially inner edge to the radially outer edge along the first azimuthal axis.

Example 36. The playback device of any of the Examples 31-35, wherein the first range of thickness varies non-uniformly in thickness from the radially inner edge to the radially outer edge along the first azimuthal axis.

Example 37. The playback device of any of the Examples 31-36, wherein the first thickness is smaller than the third thickness.

Example 38. The playback device of any of the Examples 31-37, wherein the second thickness is smaller than the fourth thickness.

Example 39. The playback device of any of the Examples 31-38, wherein the first range of thicknesses is at its maximum thickness at a location spaced apart from the radially inner edge and the radially outer edge.

Example 40. The playback device of any of the Examples 31-39, wherein the diaphragm is conical shaped.

Example 41. The playback device of any of the Examples 31-40, wherein the diaphragm comprises a plastic.

The invention claimed is:

1. A diaphragm for an audio transducer, the diaphragm comprising:

a body having a first surface extending between a radially inner edge and a radially outer edge; and a second surface of the body opposite the first surface, the second surface extending between the radially inner edge and the radially outer edge, wherein the body includes a major axis defined as having the longest length across the body and a minor axis defined as having the shortest length across the body, and wherein a thickness extending between the first surface and the second surface increases along a circumferential axis surrounding a central aperture as it approaches the major axis and the thickness decreases along the circumferential axis as it approaches the minor axis.

2. The diaphragm of claim 1, wherein the body comprises an annular body defining the central aperture.

3. The diaphragm of claim 1, wherein along a first azimuthal direction, the body has a first range of thicknesses extending between the first surface and the second surface, the first range of thicknesses comprising a first thickness adjacent the radially inner edge and a second thickness adjacent the radially outer edge, the first thickness being different from the second thickness.

4. The diaphragm of claim 3, wherein along a second azimuthal direction, the body has a second range of thicknesses extending between the first surface and the second surface, the second range of thicknesses comprising a third thickness adjacent the radially inner edge and a fourth thickness adjacent the radially outer edge, the third thickness being different from the fourth thickness.

5. The diaphragm of claim 4, wherein the body is longer along the first azimuthal direction than the second azimuthal direction.

6. The diaphragm of claim 3, wherein the first range of thicknesses increases in thickness from the radially inner edge to the radially outer edge along the first azimuthal direction.

7. The diaphragm of claim 3, wherein the first range of thicknesses varies nonuniformly in thickness from the radially inner edge to the radially outer edge along the first azimuthal direction.

8. The diaphragm of claim 4, wherein the first thickness is smaller than the third thickness.

9. The diaphragm of claim 4, wherein the second thickness is smaller than the fourth thickness.

10. The diaphragm of claim 3, wherein the first range of thicknesses is at its maximum thickness at a location spaced apart from the radially inner edge and the radially outer edge.

11. A diaphragm for an audio transducer, the diaphragm comprising:
- an annular body defining a central aperture;
- a first surface of the body extending between a radially inner edge adjacent the aperture and a radially outer edge; and
- a second surface of the body opposite the first surface, the second surface extending between the radially inner edge and the radially outer edge,
- wherein along a first azimuthal direction, the body has a first range of stiffnesses extending between the radially inner edge and the radially outer edge, the first range of stiffnesses comprising a first stiffness adjacent the radially inner edge and a second stiffness adjacent the radially outer edge, the first stiffness being different from the second stiffness, wherein a thickness of the body between the first surface and the second surface increases monotonically along the first azimuthal direction from the radially inner edge to the radially outer edge, and
- wherein along a second azimuthal direction, the body has a second range of stiffnesses extending between the radially inner edge and the radially outer edge, the second range of stiffnesses comprising a third stiffness adjacent the radially inner edge and a fourth stiffness adjacent the radially outer edge, the third stiffness being different from the fourth stiffness.

12. The diaphragm of claim 11, wherein along the second azimuthal direction, the body comprises a range of thicknesses extending between the first surface and the second surface, the range of thicknesses comprising a first thickness adjacent the radially inner edge and a second thickness adjacent the radially outer edge.

13. The diaphragm of claim 12, wherein the first thickness is different from the second thickness.

14. The diaphragm of claim 12, wherein the first range of stiffnesses is at its maximum stiffness at a location spaced apart from the radially inner edge and the radial outer edge.

15. The diaphragm of claim 11, wherein the annular body is conical shaped.

16. The diaphragm of claim 11, wherein the annular body comprises plastic.

17. An audio transducer, comprising:
- a frame;
- the diaphragm of claim 11;
- a surround resiliently coupling the radially outer edge of the diaphragm to the frame;
- a magnet attached to the frame; and
- a voice coil adjacent the magnet and operably coupled to the diaphragm, wherein the voice coil is configured to receive a flow of electric signals from an amplifier, and, in response to the received flow of electric signals, correspondingly move the diaphragm axially inward and outward with respect to the frame, thereby producing sound waves.

18. The audio transducer of claim 17, wherein the sound waves have a cutoff frequency between about 3 kilohertz (kHz) and about 7 kHz.

19. The audio transducer of claim 17, further comprising a dust cap configured to substantially axially overlap the center aperture.

20. A playback device, comprising:
- an enclosure; and
- an audio transducer according to claim 17, the audio transducer carried by the enclosure.

* * * * *